US010212202B2

(12) United States Patent
Manohar et al.

(10) Patent No.: US 10,212,202 B2
(45) Date of Patent: Feb. 19, 2019

(54) SYSTEMS AND METHODS TO MANAGE MULTICAST TRAFFIC

(71) Applicant: Big Switch Networks, Inc, Santa Clara, CA (US)

(72) Inventors: Mary Preeti Manohar, Los Gatos, CA (US); Rajneesh Bajpai, San Jose, CA (US); Ning Song, Milpitas, CA (US); Srinivasan Ramasubramanian, Sunnyvale, CA (US); Shunjia Yu, San Jose, CA (US); Richard Lane, Mountain View, CA (US); Kiran Gandhi Poola, Milpitas, CA (US); Kenneth H. Chiang, Fremont, CA (US); Robert W. Sherwood, Oakland, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 183 days.

(21) Appl. No.: 15/227,856

(22) Filed: Aug. 3, 2016

(65) Prior Publication Data

US 2018/0041555 A1 Feb. 8, 2018

(51) Int. Cl.
*H04L 29/06* (2006.01)
*H04L 12/18* (2006.01)
(Continued)

(52) U.S. Cl.
CPC .......... *H04L 65/4076* (2013.01); *H04L 12/44* (2013.01); *H04L 12/4641* (2013.01);
(Continued)

(58) Field of Classification Search
None
See application file for complete search history.

(56) References Cited

U.S. PATENT DOCUMENTS

| 6,847,620 B1* | 1/2005 | Meier | H04L 12/4641 |
| | | | 370/328 |
| 7,233,987 B2* | 6/2007 | Watkinson | H04L 12/185 |
| | | | 370/236 |

(Continued)

OTHER PUBLICATIONS

"International Application Serial No. PCT/US2017/045254, International Search Report dated Nov. 6, 2017", 4 pgs.
(Continued)

*Primary Examiner* — Patrice L Winder
(74) *Attorney, Agent, or Firm* — Schwegman Lundberg & Woessner, P.A.

(57) ABSTRACT

In various example embodiments, a system and method for optimizing management of a multicast tree are disclosed. The system receives first multicast group member information, from over a network and via a first packet forwarding system, at a controller server that provides for control of a network comprised of a first virtual local area network including a first packet forwarding system, the first multicast group member information being received by the first packet forwarding system and describing a first end-host computer as joining a first multicast group on the first virtual local area network. The system generates a multicast tree, at the controller server, and communicates a network configuration message to at least one packet forwarding system of a first plurality of packet forwarding systems to enable communication of the multicast traffic for the first multicast group over a portion of the multicast tree.

20 Claims, 29 Drawing Sheets

(51) Int. Cl.
*H04L 12/761* (2013.01)
*H04L 12/44* (2006.01)
*H04L 12/46* (2006.01)
*H04L 12/755* (2013.01)

(52) U.S. Cl.
CPC ............ *H04L 45/021* (2013.01); *H04L 45/16* (2013.01); *H04L 12/185* (2013.01)

(56) References Cited

U.S. PATENT DOCUMENTS

| | | | | |
|---|---|---|---|---|
| 7,813,287 | B2* | 10/2010 | Fine | H04L 45/02 |
| | | | | 370/238 |
| 8,638,789 | B1 | 1/2014 | Pani | |
| 9,900,263 | B2* | 2/2018 | Garcia del Rio | G06F 9/46 |
| 9,954,765 | B2* | 4/2018 | Allan | H04L 45/12 |
| 2013/0010600 | A1* | 1/2013 | Jocha | H04L 43/026 |
| | | | | 370/236.2 |
| 2013/0322443 | A1* | 12/2013 | Dunbar | H04L 12/185 |
| | | | | 370/390 |
| 2014/0098813 | A1* | 4/2014 | Mishra | H04L 12/185 |
| | | | | 370/390 |
| 2014/0098815 | A1* | 4/2014 | Mishra | H04L 45/021 |
| | | | | 370/390 |
| 2014/0226525 | A1* | 8/2014 | Eastlake, III | H04L 41/12 |
| | | | | 370/254 |
| 2014/0241353 | A1* | 8/2014 | Zhang | H04L 45/74 |
| | | | | 370/390 |
| 2015/0062285 | A1* | 3/2015 | Xu | H04L 12/1822 |
| | | | | 348/14.08 |
| 2015/0103844 | A1* | 4/2015 | Zhao | H04L 45/42 |
| | | | | 370/410 |
| 2016/0094650 | A1* | 3/2016 | Garcia de Rio | H04L 47/78 |
| | | | | 709/226 |
| 2016/0308793 | A1* | 10/2016 | Levy-Abegnoli | H04L 45/16 |
| 2016/0345054 | A1* | 11/2016 | Dhaipule | H04N 21/4384 |
| 2016/0366070 | A1* | 12/2016 | Yeung | H04L 49/201 |
| 2017/0201451 | A1* | 7/2017 | Allan | H04L 45/12 |

OTHER PUBLICATIONS

"International Application Serial No. PCT/US2017/045254, Written Opinion dated Nov. 6, 2017", 11 pgs.

Cesar, Marcondes A C, "CastFlow: Clean-slate multicast approach using in-advance path processing in programmable networks", Computers and Communications (ISCC) IEEE Symposium on IEEE, (Jul. 1, 2012), 94-101.

Ge, Jingguo, "An OpenFlow-Based Dynamic Path Adjustment Algorithm for Multicast Spanning Trees", 12th IEEE International Conference on Trust Security and Privacy in Computing and Communications IEEE, (Jul. 16, 2013), 1478-1483.

Xiaozhou, Li, "Scaling IP multicast on datacenter topologies", Proceedings of the Ninth ACM Conference on Emerging Networking Experiments and Technologies Conext 13, New York USA, (Jan. 1, 2013), 61-72.

* cited by examiner

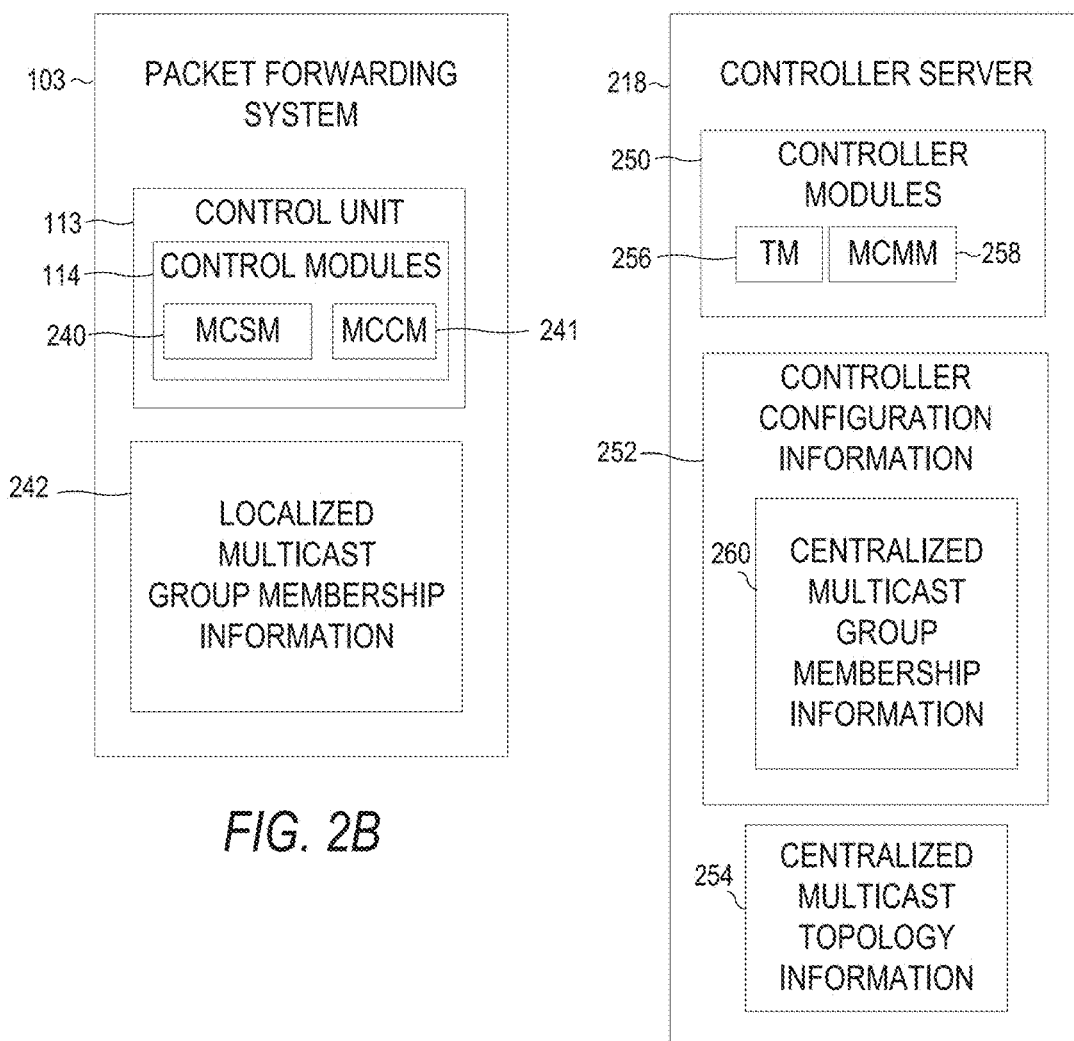

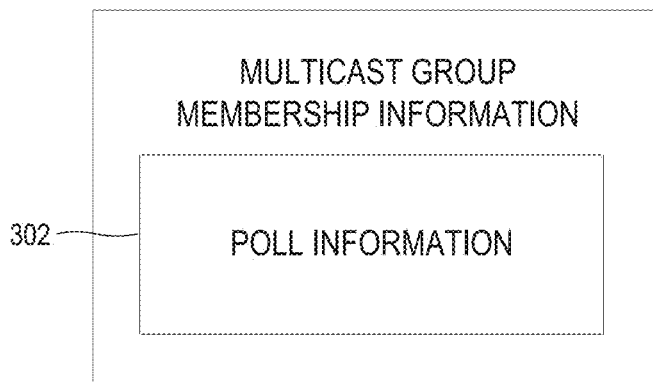
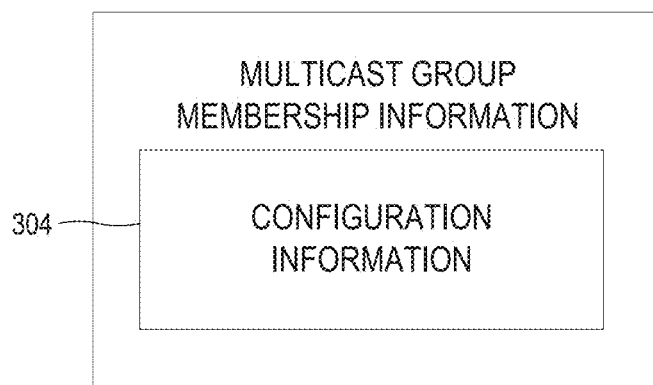
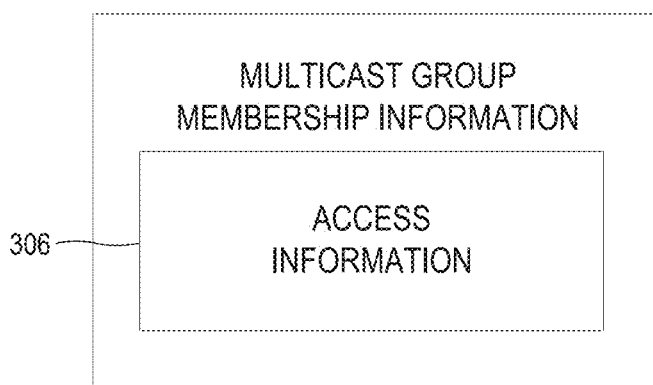
FIG. 3A

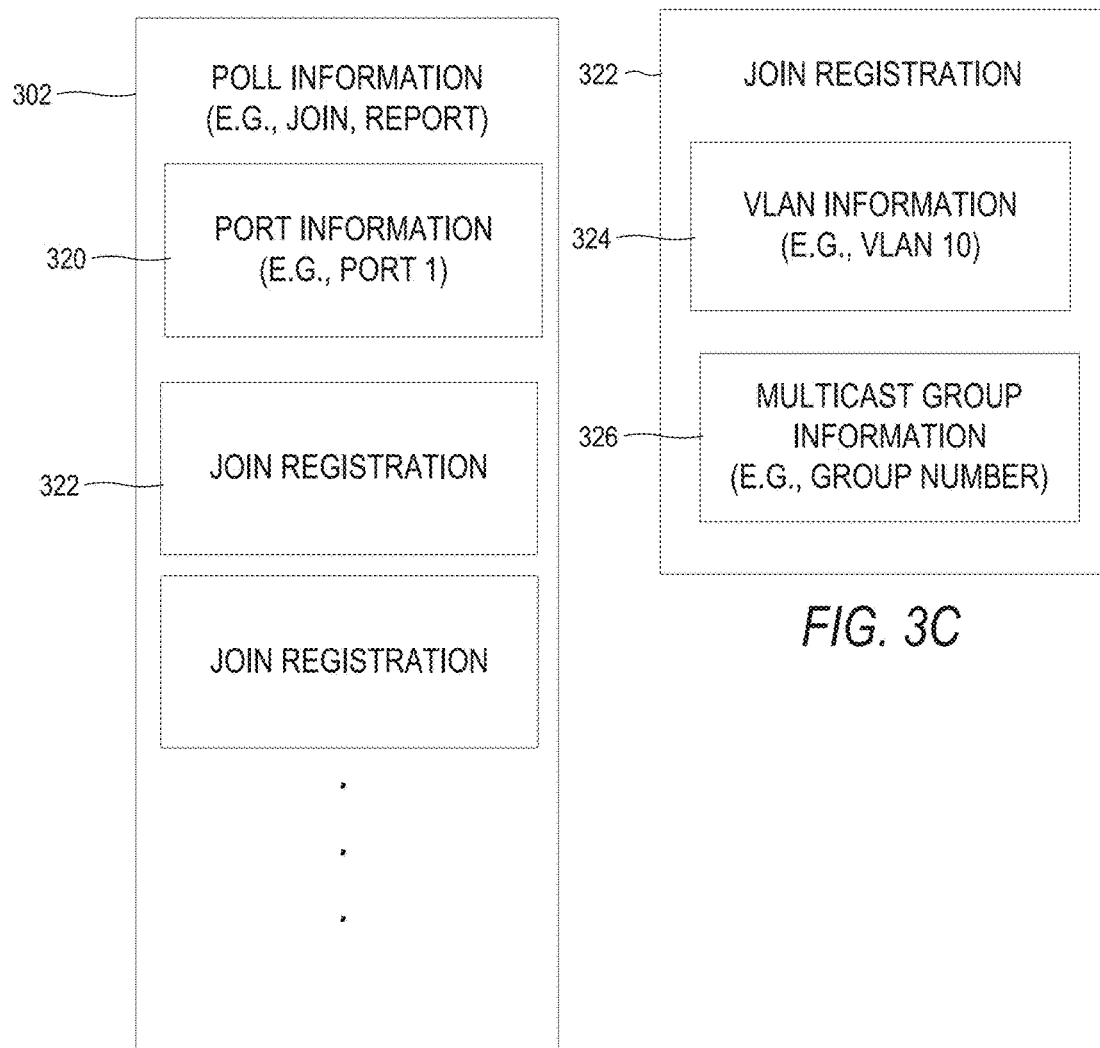

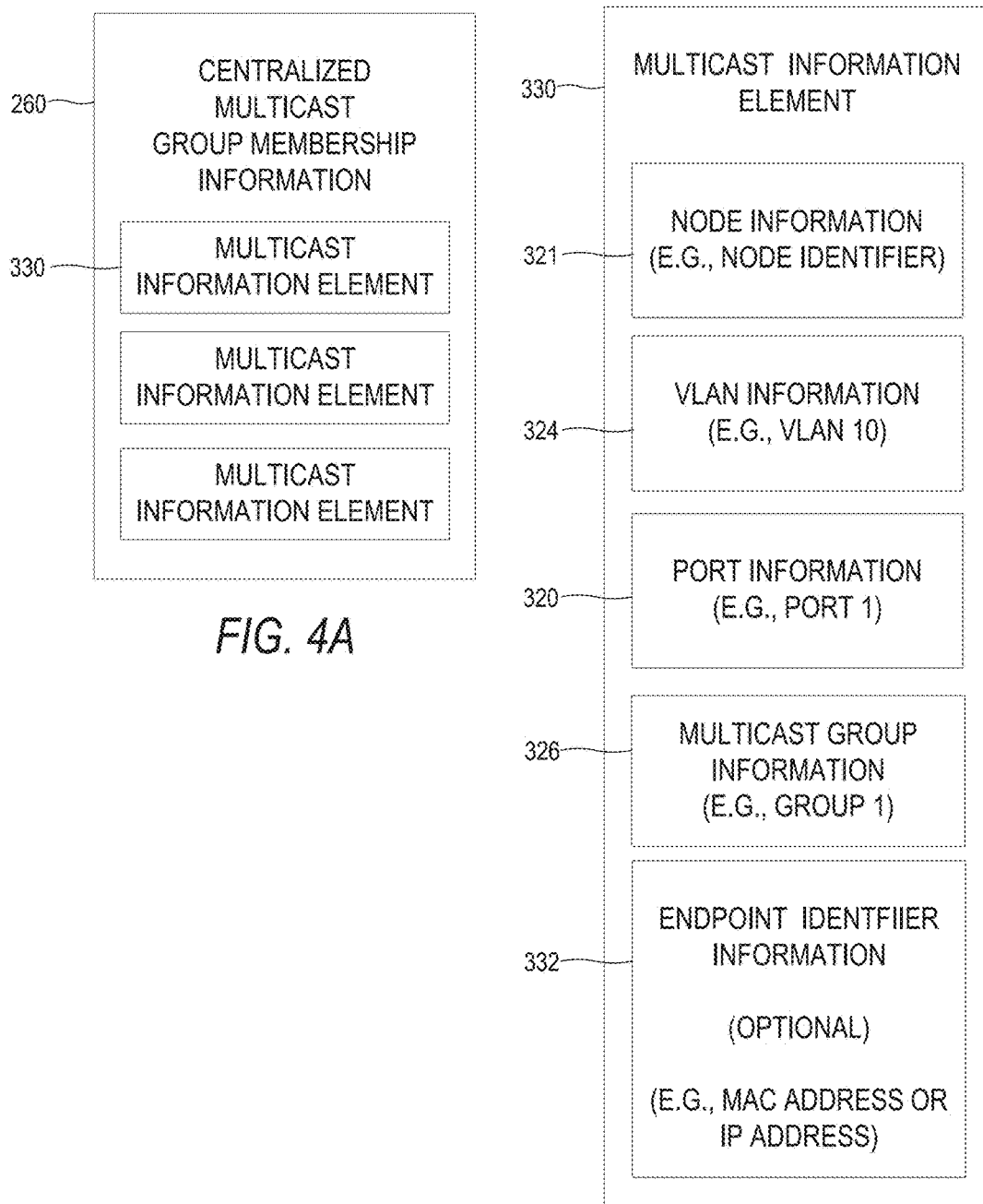

| PHYSICAL INPUT PORT | SOURCE ETHERNET ADDRESS | DESTINATION IPETHERNET ADDRESS | SOURCE IP ADDRESS | DESTINATION IP ADDRESS | SOURCE TCP PORT | DESTINATION TCP PORT | ADDITIONAL PACKET INFORMATION (E.G., HEADERS) | ACTION |
|---|---|---|---|---|---|---|---|---|
| * | * | 00:1FAB | * | * | * | * |  | SEND TO PORT 3 |
| * | * | * | * | 172.12.3.4 | * | * | ... | SEND TO PORT 4 |
| * | * | * | * | * | * | 80 |  | DROP |

FIG. 14

SYSTEMS AND METHODS TO MANAGE MULTICAST TRAFFIC

TECHNICAL FIELD

Embodiments of the present disclosure relate generally to data processing and, more particularly, but not by way of limitation, to systems and methods to manage multicast traffic.

BACKGROUND

Multicast is communication where a message is sent (multicast) to a group of destinations "simultaneously." Multicast may be implemented by software protocols that are executed by network peers in a distributive manner. For example, the Internet Group Management Protocol (IGMP) is a multicast communication protocol that is executed by network peers including hosts and routers to establish multicast group membership for a multicast group. Further, for example, Protocol Independent Multicast (PIM) is a multicast communication protocol that is executed by network peers including routers to establish multicast service across subnetworks for a multicast group.

BRIEF DESCRIPTION OF THE DRAWINGS

Various ones of the appended drawings merely illustrate example embodiments of the present disclosure and cannot be considered as limiting its scope.

FIG. 2B is a block diagram illustrating a packet forwarding system, according to an embodiment;

FIG. 2C is a block diagram illustrating a controller server, according to an embodiment;

FIG. 3A is a block diagram illustrating multicast group member information, according to example embodiments;

FIG. 3B is a block diagram illustrating poll information, according to an example embodiment;

FIG. 3C is a block diagram illustrating a join registration, according to an example embodiment;

FIG. 4A is a block diagram illustrating centralized multicast group membership information, according to an example embodiment;

FIG. 4B is a block diagram illustrating a multicast information element, according to an example embodiment;

FIG. 14 is a block diagram illustrating a flow table storing three flow table entries;

Figure 1A:
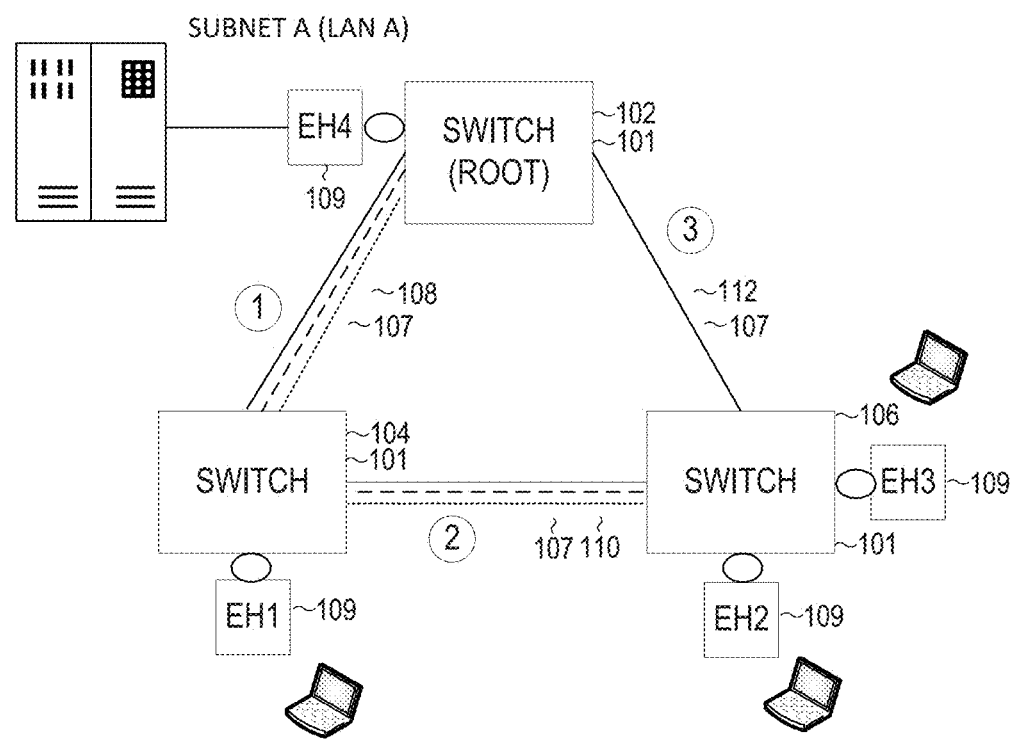
FIG. 1A is a block diagram illustrating a legacy system, according to an embodiment.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative example embodiments of the disclosure. In the following description, for the purposes of explanation, numerous specific details are set forth in order to provide an understanding of various example embodiments. It will be evident, however, to those skilled in the art, that example embodiments of the subject matter herein may be practiced without these specific details. In general, well-known instruction instances, protocols, structures, and techniques are not necessarily shown in detail.

According to a first aspect of the present disclosure, systems and methods to optimize management of a multicast tree are disclosed. The systems and methods to optimize management of a multicast tree are primarily realized by locating management in a controller server. The controller server may, for example, manage a multicast tree contained in a single subnetwork or a multicast tree that spans two or more subnetworks. The method to optimize management of a multicast tree, according to an embodiment, comprises an end-host (e.g., laptop computer) receiving a query for multicast group membership from a packet forwarding system. The end-host may respond to the query by communicating multicast group member information in the form of poll information (e.g., report information) to the packet forwarding system. The poll information may indicate an interest in one or more multicast groups in association with a point of access on a network. For example, the poll information may indicate a "JOIN" to a multicast group at a point of access on the network or a "LEAVE" from a multicast group at the point of access on the network.

The method continues at a packet forwarding system receiving and communicating the poll information to the controller server. The controller server, in turn, receives the multicast group member information in the form of poll information and updates a database based on the multicast group member information. For example, the multicast group member information may indicate a multicast member is joined to a "multicast group one" on a "virtual local area network one," on "port one" of a "packet forwarding system one" in a network. The controller server generates a multicast tree based on the updated databases and configures the multicast tree in the network by communicating one or more network configuration messages to packet forwarding system(s) to enable portions of the multicast tree at each of the packet forwarding system(s). This aspect achieves efficiencies over traditional multicast where peer nodes in a network generate multicast trees and converge on a particular multicast tree, as described more fully below. In contrast, the present aspect centrally locates management in a controller server. It will also be observed that central management is for a multicast group within a subnetwork or for a multicast group that spans two or more subnetworks.

According to a second aspect of the present disclosure, systems and methods to optimize management of multicast member discovery are disclosed. The second aspect includes a first feature and a second feature. The first feature includes systems and methods to process polling information and the second feature includes systems and methods to process a configuration command. The first feature is contained within the first aspect but is described in greater detail in the second aspect. The first feature includes a method to process polling information, according to an embodiment. The method to process polling information includes a packet forwarding system identifying an end-host as being connected to a port (rather than a packet forwarding system as being connected to the port) and communicating a query for multicast group membership information out the port to the end-host. Accordingly, the packet forwarding system does not query ports that are connected to other packet forwarding systems, thereby achieving an efficiency over traditional multicast by reducing processing at the packet forwarding system. Further, the packet forwarding system does not query ports by flooding the query to peer nodes, thereby achieving an efficiency over traditional multicast by reducing processing at the packet forwarding systems and by reducing bandwidth utilization in the subnetwork and across subnetworks.

Continuing with the method, the end-host receives the query and responds to the query by communicating poll information to the packet forwarding system. For example, the poll information may indicate a "JOIN" to a multicast group at a point of access on the network or a "LEAVE" from a multicast group at the point of access on the network. The packet forwarding system identifies whether the poll information indicates a change in multicast interest/membership for the port, and responsive to identifying a change the packet forwarding system, communicates the poll information to a controller server that, in turn, processes the poll information as described above in the first aspect. The above mentioned query is periodically communicated over ports that connect end-hosts to the packet forwarding systems.

Efficiencies are achieved in at least two additional respects. First, network bandwidth is saved by not flooding the poll information (e.g., "report information," "JOIN information") throughout a network, as is done in traditional multicast. Second, the packet forwarding system achieves a steady state condition for each multicast group on a port and, but for a change in state, the packet forwarding system does not communicate the poll information to the controller server. It will be observed that periodic polling is performed as part of a "keep alive" mechanism. The "keep alive" mechanism identifies a change in state for a multicast group by periodically querying a port to request status of interest in the multicast group and keeping alive the service for the multicast group responsive to an affirmative indication that interest is being sustained for the multicast group. Accordingly, network bandwidth is saved by not communicating the poll information to the controller server unless a state change is detected (e.g., "JOIN" to a multicast group, "LEAVE" from a multicast group, etc.).

The second feature includes a method to process a configuration command, according to an embodiment. The method to process a configuration command may include a packet forwarding system receiving user command information indicating whether to "JOIN" an end-host to a multicast group or to "LEAVE" an end-host from a multicast group. This may be a manual operation whereby a user enters command information via a user interface that, in turn, is communicated to the packet forwarding system that, in turn, communicates configuration information, including the user command information, to the controller server. For example, a user command to "JOIN" an end-host to "multicast group one" may result in the controller server receiving a node identifier identifying the packet forwarding system that received the user command information and configuration information including a port identifier identifying the port on which an end-host is being "JOIN"ed, a multicast group identifier identifying the multicast group on which the end-host is being "JOIN"ed, a virtual local area network (VLAN) identifier identifying the virtual local area network on which the end-host is being "JOIN"ed, and optional endpoint identifier information (e.g., media access control (MAC) address/Internet Protocol address) uniquely identifying the end-host. In response to receiving the configuration information, the controller server processes the "JOIN" as described in the first aspect. According to another embodiment the configuration command may be received directly by the controller server. According to another embodiment the configuration command may be received by some device other than a packet forwarding system and communicated to the controller server.

According to a third aspect of the present disclosure, systems and methods to manage an endpoint as a multicast group member are disclosed. The method to manage an endpoint as a multicast group member, according to an embodiment, includes an interaction of an end-host with a packet forwarding system that is detected/identified by the packet forwarding system. For example, the packet forwarding system may detect the end-host as being connected to the packet forwarding system at a particular access point on the packet forwarding system. Responsive to identifying the interaction, the packet forwarding system communicates access information to the controller computer. The access information may include end point identifier information (e.g., MAC address, IP address) that uniquely identifies the end-host that was connected to the packet forwarding system and other information that identifies the access point on the packet forwarding system to which the end point was connected. The controller server receives and processes the access information to identify whether a multicast member that was previously associated with the end point identifier information has moved from one access point on the network to another access point on the network. Responsive to this identification, according to an embodiment, the controller computer may process a "LEAVE" (e.g., old network access point) and a "JOIN" (e.g., old network access point) for the end-host to reflect the new access point that is being utilized by the end-host.

According to a fourth aspect of the present disclosure, systems and methods to optimize management of a centralized multicast topology information are described. The systems and methods to optimize management of a centralized multicast topology information are primarily realized by centrally locating management of the centralized multicast topology information in a controller server. For example, the centralized multicast topology information may describe a network topology comprised of packet forwarding systems (e.g., switches, routers, etc.) and communication links supporting a one or more multicast groups. A multicast group may include members that access a network via a single subnetwork or via two or more subnetworks. A method to optimize management of a centralized multicast topology information, according to an embodiment, includes a controller server communicating probe messages to the packet forwarding systems in a network. For example, the controller server may send Link Layer Discovery Protocol (LLDP) probe packets through the network to discover the topology of a network. In response to receiving the probe messages, the packet forwarding systems may identify topographic status information and communicate the topographic status information to the controller server. The topographic status information may for example describe the topology of a network and the status of communication links. The topographic status information may describe a topology of the network and the status of communication links from the point of view of the packet forwarding system that received the probe message. For example, the topographic status information may indicate: 1) a packet forwarding system (e.g., "Node D") as being added to the network, 2) the packet forwarding system including a communication link on "port three" with a failed status (e.g., non-functional) and 3) a communication link on "port four" that connects the packet forwarding system (e.g., "Node D") to a neighboring packet forwarding system (e.g., "Node C"), previously registered in the network. The controller server may receive the topographic status information described above from a packet forwarding system in addition to other topographic status information from other packet forwarding systems. The controller server updates centralized multicast topology information based on the topographic status information. The controller server further generates one or more multicast trees based on the centralized multicast topology information as updated. For example, the controller server may generate the one or more multicast trees by identifying one or more loop-free shortest paths in a network including communication links that are operational (e.g., not failed) and connecting all of the packet forwarding systems in a subnetwork. Further, for example, the controller server may generate a multicast tree that spans two or more subnetworks (e.g., LAN A, LAN B, etc.). The controller server configures the multicast tree by communicating one or more network configuration messages to packet forwarding system(s) to respectively enable portions of the one or more multicast trees at each of the packet forwarding system(s) in the network.

It will be appreciated that the controller server may include one or more controller servers that collectively achieve centralized control. For example, a first controller server may be operating in a standby mode as a redundant backup for a second controller server operating in an active mode. Further for example, a first controller server may process in parallel with a second controller server to collectively achieve centralized control, and the like.

FIG. 1A is a block diagram illustrating a legacy system 100, according to an embodiment. The legacy system 100 is found in the prior art and may be used to manage multicast traffic. Multicast traffic may be distinguished according to multicast groups. For example, multicast traffic for "multicast group one" is distinguishable from multicast traffic for "multicast group two," and so forth. Multicast groups include multicast members, each of which may function as a sender and a receiver. A sender may send a message that is "simultaneously" received by each of the other members of the multicast group. For example, an Internet Protocol TV service may be a multicast service that includes a sender in a multicast group that sends a single stream of content that, in turn, is "simultaneously" received by each of the other members of the multicast group. Further for example, a stock ticker service may be a multicast service that includes a sender in a multicast group that sends a stock quote that, in turn, is simultaneously received by each of the other members of the multicast group. Multicast does not utilize point-to-point communication. Rather, multicast optimizes communication resources. For example, consider a source or sender (e.g., member) in a multicast group that sends a message that is received by successive nodes (e.g., switches, routers, etc.) in a network where the message is replicated and forwarded, as is necessary, to reach each of the other members of the multicast group. Accordingly, a node in a network may receive a packet on a port and replicate the packet for forwarding to another port on the node or as many ports, as is necessary, to reach members of a multicast group that are known by the node to be reachable downstream via the respective ports.

The legacy system 100 includes three legacy packet forwarding systems 101 in the form of three switches including switch 102, 104 and 106. The term "switch," in this document, may be utilized to describe a legacy packet forwarding system 101 that provides layer two services, as described in the open systems interconnection (OSI) model. Each legacy packet forwarding system 101 includes ports that may be connected to communication links 107 to form a topology. For example, the legacy system 100 includes communication links 107 include a first communication link 108, connecting switch 102 to switch 104; a second communication link 110, connecting switch 104 to switch 106; and a third communication link 112, connecting switch 106 to switch 102 to form a topology.

Each legacy packet forwarding system 101 also includes ports that are used to connect end-hosts 109 (e.g., EH1, EH2, EH3, EH4, etc.) to the legacy packet forwarding system 101. For example, a legacy packet forwarding system 101 may include a port that is connected to end-host 109 that is embodied as a laptop computer, a personal computer, a desktop computer, a mobile telephone, and the like.

The legacy system 100 illustrates a single LAN (or subnet) comprised of the legacy packet forwarding systems 101 including switch 102, 104, and 106 and is connected by communication links 107 illustrated with a sold line to form a ring topology for "LAN A." The end-hosts 109 may communicate (e.g., EH1, EH2, EH3, EH4, etc.) with each other via the "LAN A" or by utilizing a multicast service that is logically applied over "LAN A."

"LAN A" facilitates communication on a control plane and a data plane. The control plane may be utilized to facilitate a provision of LAN service on a data plane. For example, the control plane for the LAN may be comprised of legacy packet forwarding systems 101 (e.g., switch 102, 104, 106) that communicate with each other to generate the above mentioned topology. The topology describes the legacy packet forwarding systems 101 (e.g., switch 102, 104, 106) that comprise the LAN and further includes the specific ports of each of the legacy packet forwarding systems 101 that support communication links 107 that connect each legacy packet forwarding system 101 with the other legacy packet forwarding systems 101. The legacy packet forwarding systems 101 (e.g., switch 102, 104, 106) may further communicate with each other over the control plane (e.g., program flow tables) to build a data plane (e.g., program flow tables) to facilitate communication on the "LAN A" and to facilitate communication on the multicast service, as described below. In some instances, an end-host 109 on the data plane may communicate with a legacy packet forwarding system 101 (e.g., switch, router, etc.) on a control plane and a legacy packet forwarding system 101 (e.g., switch, router, etc.) on the control plane may communicate with an end-host 109 on the data plane.

LAN communication is with packets (fixed length) or frames (variable length) both (henceforth "packets") of which include a header that, among other things, identifies the source and destination of a packet. LAN communication, at a legacy packet forwarding system 101, may be comprised of receiving a packet on one port and dropping the packet or, alternately, replicating and forwarding the packet out one or more of the other ports of the legacy packet forwarding system 101. The legacy packet forwarding system 101 includes a programmable flow table or another packet forwarding decision engine to replicate and forward the packets. Replication and forwarding out a port is performed responsive to a legacy packet forwarding system 101 receiving a packet and matching a destination in the header of the packet with a programmable flow table entry that further specifies an action to be performed, such as the described forwarding out a particular port. The multicast service for the legacy system 100 is implemented over the LAN by the switch 102, 104, and 106. Multicast service, as found in the prior art, is not centrally controlled in the legacy system 100, but rather, distributed over the legacy system 100 at each of the legacy packet forwarding systems 101.

Multicast service provides for servicing of one or more multicast groups on a particular LAN and for one or more multicast groups that span LANs. Each multicast group is associated with a spanning tree, a multicast tree, and multicast group members. For example, legacy system 100 includes a spanning tree in legacy system 100 as illustrated with low frequency dashed lines to signify a group of communication links 107 and including first communication link 108, connecting switch 102 to switch 104, and second communication link 110, connecting switch 104 to switch 106. The spanning tree is a loop-free single active path connecting the nodes (e.g., router, legacy packet forwarding system 101, etc.) of a network. The spanning tree in the legacy system 100 is utilized by the switch 102, 104 and 106 to multicast control information for a particular multicast group (e.g., multicast group one). For example, switch 102 may multicast a control message to switch 104 and switch 106 over the spanning tree identified by the dashed lines, as previously described. The spanning tree may be generated and regenerated in response to changes in the topology of legacy system 100 (e.g., node addition, node deletion, communication link state change (e.g., failed, OK) etc.). The spanning tree may be generated and regenerated irrespective of multicast group membership and irrespective of multicast group members.

The multicast tree in legacy system 100 is illustrated with high frequency dots to signify a group of communication links 107 including the first communication link 108, connecting switch 102 to switch 104, and the second communication link 110, connecting switch 104 to switch 106. The multicast tree is utilized by the end-hosts 109 to communicate multicast traffic for particular a multicast group. For example, EH3 may multicast a message (e.g., stock quote) to EH2, EH1, and EH4 over the multicast tree. The multicast tree for a multicast group may be generated and regenerated in response to changes in multicast membership of the multicast group and network topology changes. If, for example, both end-hosts 109 (e.g., EH2 and EH3) that are attached to switch 106 were to "LEAVE" the multicast group, then the second communication link 110 for the multicast tree would be removed or purged from the multicast tree, leaving first communication link 108 as the sole communication link 107 for the multicast tree for multicast group one.

Figure 1B:
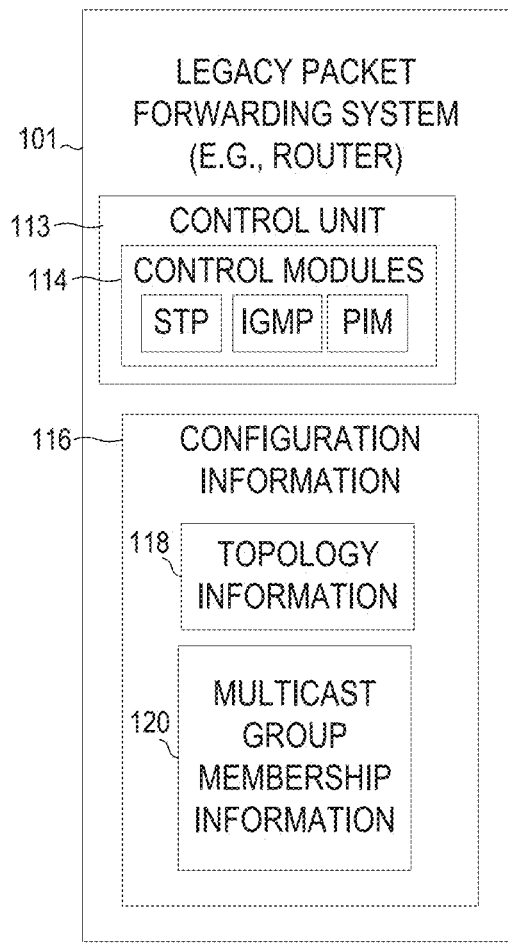
FIG. 1B is a block diagram illustrating a legacy packet forwarding system, according to an embodiment.

FIG. 1B is a block diagram illustrating a legacy packet forwarding system 101 (e.g., switch), according to an embodiment. The legacy packet forwarding system 101 includes a control unit 113 that includes control modules 114 and configuration information 116 (e.g., persistent storage). The control modules 114 may include a suite of modules that are utilized to implement the multicast service. For example, the control modules 114 may include spanning tree protocol (STP) modules, the Internet Group Management Protocol (IGMP) modules, and protocol independent multicast (PIM) modules. In addition, the configuration information 116 may store topology information 118 that describes a topology of the LAN from the point of view of the legacy packet forwarding system 101 and multicast group membership information 120 from the point of view of the legacy packet forwarding system 101.

Configuration Information

The multicast group membership information 120, stored at any particular legacy packet forwarding system 101, (e.g., switch) may indicate the interest for multicast traffic according to groups and ports. For example, the multicast group membership information 120 for a legacy packet forwarding system 101 may be organized as follows:

| Port | Multicast Group "1" | Multicast Group "2" | Multicast Group "3" |
|---|---|---|---|
| "1" | Yes | Yes | No |
| "2" | Yes | No | Yes |
| "3" | Yes | No | No |
| "4" | Yes | No | No |

The above table of multicast group membership information 120 is for a particular legacy packet forwarding system 101. The multicast group membership information 120 indicates, for example, interest on "Port 1" for "Multicast group one" and "Multicast Group 2" but not for "Multicast Group 3." In addition, a particular column in the row for Port "1" does not indicate whether the indicated interest is being expressed from a communication link 107 or from an end-host 109. Further note, in the case where "Port 1" supports a communication link 107, the interest being indicated is not indicative of the location of the interest (e.g., in the immediate legacy packet forwarding system 101 or beyond) but only that the interest is reachable via "Port 1."

Spanning Tree Control Protocol

The spanning tree protocol (STP) module executes at each of the legacy packet forwarding systems 101 in legacy system 100 to generate a spanning tree. In the present context, the spanning tree is a loop-free tree within a LAN for communicating control information including multicast control information. The STP module generates a spanning tree based on the topology of the network as stored in the topology information 118. Accordingly, the STP module may be invoked at each of the legacy packet forwarding systems 101 in the legacy system 100 responsive to a topology change in the legacy system 100 to generate a new spanning tree. For example, a topology change may include adding a legacy packet forwarding system 101 to the topology information 118 or removing a legacy packet forwarding system 101 from the topology information 118. Note that multiple spanning trees may satisfy a loop-free criterion for any particular network and that the STP module executes independently on each of the legacy packet forwarding systems 101 in the legacy system 100. Accordingly, the independence of each STP module executing at the legacy packet forwarding systems 101 and the multiple spanning trees, each of which satisfying the loop-free criterion, may extend processing time. For example, the STP modules, at different legacy packet forwarding systems 101, may process for an extended period of time before reaching convergence (agreement) on a particular multicast tree for a particular multicast group. Further, multiple changes to the topology information 118 in a relatively short period of time may cause processing for an extended period of time before reaching convergence (agreement) on a particular multicast tree for a particular multicast group because of volatility in the topology information 118.

Returning to FIG. 1A, for example, the spanning tree for group "one" for the legacy system 100 includes the first communication link 108, identified "1," and the second communication link 110, identified "2." Building a spanning tree for multicast group "one" may, for example, include the STP module, at switch 102, executing responsive to a change in the topology (e.g., topology information 118) of the "LAN A." Further for example, the STP module, at switch 102, may execute to register the port connected to first communication link 108 as part of the spanning tree for "multicast group one" and program the flow table on switch 102 to send multicast control packets identified for "multicast group one" out first communication link 108, the first link of the spanning tree for "multicast group one."

IGMP

Returning to FIG. 1B, the Internet Group Management Protocol (IGMP) modules may execute at each legacy packet forwarding system 101. The IGMP modules, as is known in the prior art, may execute in the LAN to detect whether an end-host 109 (e.g., member) is added to a multicast group (e.g., "JOIN") or detect whether an end-host 109 (e.g., member) is removed from a multicast group (e.g., "LEAVE"). The IGMP modules store multicast member status as multicast group membership information 120, as previously described. The IGMP modules may periodically execute at each legacy packet forwarding system 101 to poll the ports of the legacy packet forwarding system 101 to query for interest in multicast groups. In addition, the IGMP modules may be invoked by a user configuration command that is received by the legacy packet forwarding system 101 on which it resides.

The IGMP module, according to some embodiments, may execute at designated IGMP-snooping switch(es). The IGMP-snooping switches may flood a multicast control query over the LAN and to end-hosts 109 that are connected to the LAN. Flooding is based on a local knowledge of a network and not complete knowledge of the network. For example, a legacy packet forwarding system 101 may receive a multicast control query on one port and respond by flooding the multicast control query out on every outgoing port except the port on which it arrived.

A legacy packet forwarding system 101 (e.g., switch) may receive a multicast control query on a particular port and respond by generating and forwarding "report information" back over the port on which the multicast control query was received. The legacy packet forwarding system 101 (e.g., switch) may generate the "report information" based on the multicast group membership information 120 that is stored at the legacy packet forwarding system 101. For example, the multicast group membership information 120 for a particular legacy packet forwarding system 101 may indicate interest for one or more multicast groups in association with the ports that are being supported by the legacy packet forwarding system 101.

A legacy packet forwarding system 101 (e.g., switch) may receive "report information" on a particular port and respond by updating the multicast group membership information 120 that is stored at the legacy packet forwarding system 101. The legacy packet forwarding system 101 (e.g., switch) may update the multicast group membership information 120 based on the received report information. In addition, the legacy packet forwarding system 101 may generate report information based on the on the multicast group membership information 120 that was updated and flood the LAN with the updated report information.

PIM

The protocol independent modules (PIM), as is known in the prior art, may execute at each of the legacy packet forwarding systems 101 to identify and facilitate the routing of multicast traffic for a particular multicast group that spans two subnetworks (e.g., LAN). For example, a router on "VLAN 1" may communicate with the PIM and the PIM may communicate with other router outside of "VLAN 1" to establish a multicast tree and a spanning tree that spans the subnetworks. Further for example, a router on "VLAN 1" may communicate with the PIM and the PIM may communicate with other switches/routers on "VLAN 2," "VLAN 3," and the like to establish a multicast tree and a spanning tree that spans the multiple subnetworks.

Figure 1C:
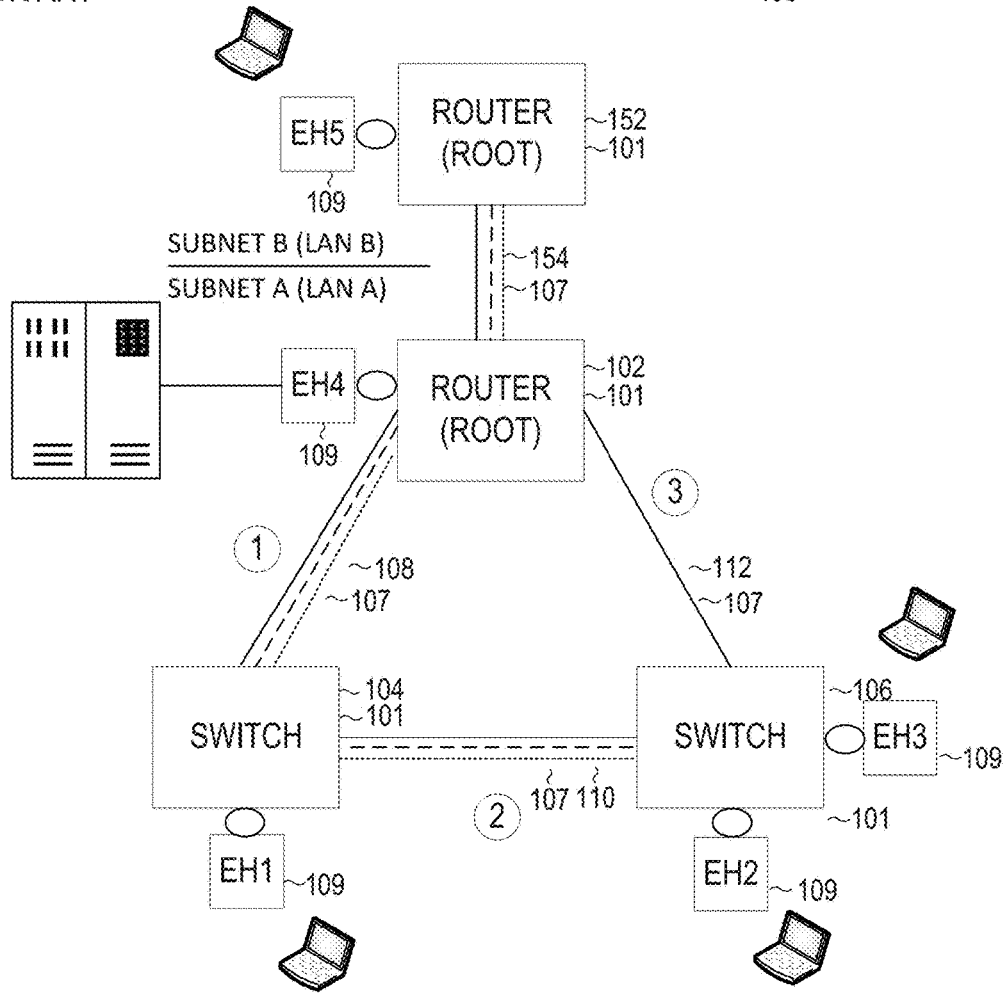
FIG. 1C is a block diagram illustrating a legacy system, according to an embodiment.

FIG. 1C is a block diagram illustrating a legacy system 150, according to an embodiment. The legacy system 150 corresponds to the legacy system 100 in FIG. 1A; accordingly, the same or similar references have been used to indicate the same or similar features unless otherwise indicated. The legacy system 150 is found in the prior art and may be used to manage multicast traffic spanning two subnetworks including subnet A (e.g., LAN A) and subnet B (e.g., LAN B). The legacy system 150 includes router 152 (e.g., legacy packet forwarding system 101) in "subnet B" (e.g., LAN B) and router 102 (e.g., legacy packet forwarding system 101) in "subnet A' (e.g., LAN A). The term "router," in this document, may be utilized to describe a legacy packet forwarding system 101 that provides layer two and/or layer three services, as is described in the open systems interconnection (OSI) model. The router 152 is connected to an end-host 109 (EH5) that is a member of "multicast group one" including (EH1, EH2, EH3, EH4, and EH5). Further, EH5 is included in "subnet A" and EH1, EH2, EH3, and EH4 are in included in "subnet B." Finally, the router 102 in subnet A (e.g., LAN A) is connected over communication link 107 including communication link 154 with router 152 in subnet B (e.g., LAN B). Merely for example, the PIM may execute at routers 152 or 102, or switches 104 or 106 to generate and configure the multicast tree and spanning tree to facilitate the communication of multicast traffic between the multicast group member EH5 in subnet B (e.g., LAN B) and the multicast group members EH1, EH2, EH3, and EH4 included in subnet-A (e.g., LAN A). It will be appreciated that the PIM executes, in a distributed manner, at each of the peer legacy packet forwarding systems 101 in legacy system 150 to provide multicast service for a multicast group that spans two subnetworks including "subnet A" (e.g., LAN A) and "subnet B" (e.g., LAN A).

Figure 2A:
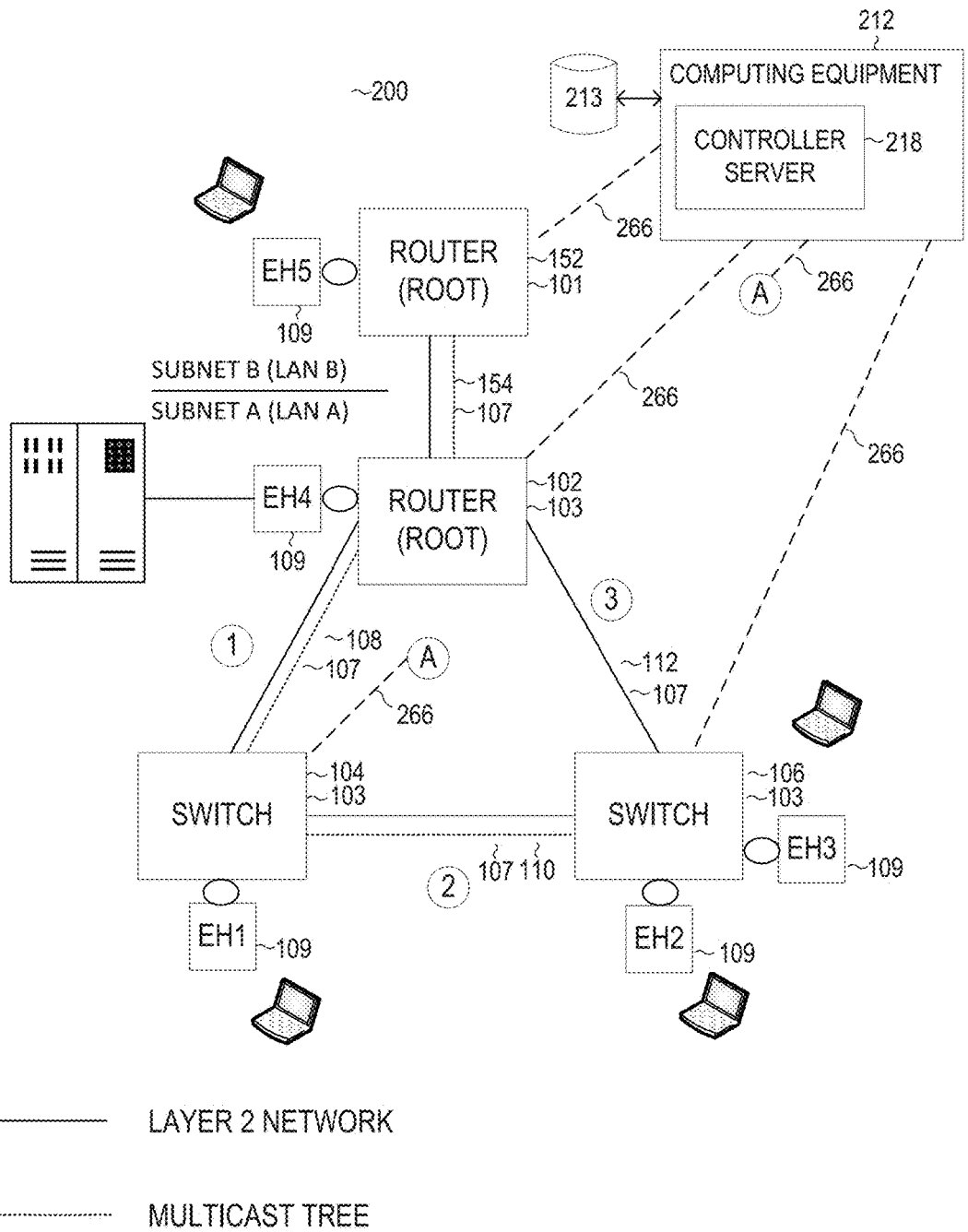
FIG. 2A is a block diagram illustrating a system, according to an embodiment, to centrally manage multicast traffic.

FIG. 2A is a block diagram illustrating a system 200, according to an embodiment, to centrally manage multicast traffic. The system 200 corresponds to the legacy system 100 in FIG. 1A and the legacy system 150 in FIG. 1C; accordingly, the same or similar references have been used to indicate the same or similar features unless otherwise indicated. The system 200 includes components that are new and not found in the legacy systems 100 or 150. Further, the system 200 excludes components that are found in the legacy systems 100 and 150, as may be described further below.

The system 200 includes computing equipment 212 including one or more controller servers such as controller server 218. The controller server 218 is communicatively coupled to a database 213 that persistently stores tables, data, relational databases, and the like. The controller server 218 is communicatively coupled via network paths 266 to control units 113 (shown in FIG. 2B) included in each of the packet forwarding systems 103 (shown in FIG. 2B). The controller server 218 is communicatively coupled to packet forwarding systems 103 to implement a network configuration and for performing other types of centralized control including the centralized control of multicast traffic. For example, the multicast services described in association with FIG. 1A, FIG. 1B, and FIG. 1C are no longer managed in a distributive manner by the legacy packet forwarding systems 101, but rather are now centrally managed by the controller server 218. That is, the controller server 218 centrally manages the multicast service provided by system 200 by communicating over network paths 266 with the control units 113 (shown in FIG. 2B) in each of the packet forwarding systems 103. A network path may, for example, include a path that supports a network connection between packet forwarding systems 103 (e.g., switch, router, etc.) and external equipment (e.g., communication link 107 of FIG. 1A) or may be a backbone path in a rack-based system. Further, the system 200, it will be observed, is not illustrated as including a spanning tree, as found in the prior art, for the reason that centralized multicast does not utilize a spanning tree service to implement centralized multicast. The term "switch," in this document, may further be utilized to describe a packet forwarding system 103 that provides layer two services, as described in the open systems interconnection (OSI) model. The term "router," in this document may further be utilized to describe a packet forwarding system 103 that provides layer two and/or layer three services, as is described in the open systems interconnection (OSI) model.

FIG. 2B is a block diagram illustrating a packet forwarding system 103, according to an embodiment. The packet forwarding system 103 illustrated in FIG. 2B is utilized to centrally manage multicast traffic. The packet forwarding system 103 of FIG. 2B illustrates the absence of STP modules, the absence of PIM modules, and the absence of IGMP modules from the control unit 113. Functions that were performed by the STP modules, the PIM modules, and the IGMP modules in a distributed manner may now be centrally controlled by the controller server 218, according to an embodiment as described below. It will further be appreciated that processing is different as the functionality of STP modules, the PIM modules, and the IGMP modules is not merely migrated to the controller server 218 but, in specific instances, substantially altered for adaptation to a centralized architecture. To this end, the packet forwarding system 103 includes a multicast support module 240 (MC SM) and a multicast communication module 241 (MCCM).

Multicast Support Module and Multicast Communication Module

The multicast support module 240 and the multicast communication module 241 may execute at each packet forwarding system 103 in the system 200 to detect whether an end-host 109 (e.g., member) is added to a multicast group (e.g., "JOIN") or to detect whether an end-host 109 (e.g., member) is removed from a multicast group (e.g., "LEAVE"). The multicast communication module 241 may periodically execute at a packet forwarding system 103 to poll ports on the packet forwarding system 103 that are identified as being connected to end-hosts 109 (e.g., EH1, EH2, etc.). The multicast communication module 241 polls a port connected to an end-host 109 by communicating a query for multicast group membership information out the port to the end-host 109. The multicast communication module 241 does not poll ports that are identified as being connected to packet forwarding systems 103 or other network entities that are not end-host 109. Accordingly, the multicast communication module 241 executes in a resource efficient manner to reduce CPU usage by not polling ports connected to packet forwarding systems 103. Further, the multicast communication module 241 executes in a resource efficient manner to reduce utilization of bandwidth on communication links 107 by not polling ports connected to communication links 107 connected to packet forwarding systems 103, as previously mentioned. The end-host 109 may respond to the query for multicast member status by generating multicast group member information (e.g., report) in the form of multicast poll member information and communicating the multicast group member information back over the port from which the query was received. The multicast group member information indicates interest by the end-host 109 in one or more multicast groups. The multicast communication module 241 receives the report information from an end-host 109. The multicast support module 240 identifies whether the multicast interest has changed on the port. The multicast communication module 241 updates the localized multicast group membership information 242 responsive to the multicast support module 240 identifying the multicast interest has changed on the port. Finally, the multicast communication module 241 communicates the report information over a network path 266 to the controller server 218 responsive to multicast support module 240 identifying the multicast interest has changed on the port.

Localized Multicast Group Membership Information

The localized multicast group membership information 242 is a data structure that stores, at any particular packet forwarding system 103 (e.g., router), the interest for multicast traffic according to groups and for each port connected to an end-host 109. For example, the localized multicast group membership information 242 for a packet forwarding system 103 may be organized as follows:

| Port | Multicast Group "1" | Multicast Group "2" | Multicast Group "3" |
|---|---|---|---|
| "1" | Yes | Yes | No |
| "3" | Yes | No | No |

The above table of localized multicast group membership information 242 is for a particular packet forwarding system 103. The localized multicast group membership information 242 indicates, for example, interest on "port one" for "multicast group one" and "multicast group two" but not for "multicast group 3." The localized multicast group membership information 242 does not store interest information for ports that connect to packet forwarding systems 103, as this information is no longer necessary for a centrally managed multicast service. The localized multicast group membership information 242 may be persistently stored in a database.

The multicast support module 240 may utilize the localized multicast group membership information 242 to identify whether to communicate multicast group member information to the controller server 218. The multicast support module 240 may compare a row of the localized multicast group membership information 242 with poll information for the corresponding port to identify whether the poll information constitutes a new "JOIN", a new "LEAVE", or merely reports the status-quo.

FIG. 2C is a block diagram illustrating the controller server 218, according to an embodiment. The controller server 218 may include controller modules 250, controller configuration information 252, and centralized multicast topology information 254. The controller configuration information 252 and centralized multicast topology information 254 may be stored in a database 213 (shown in FIG. 2A). The controller modules 250 may include a topology module 256 (TM) and a multicast management module 258 (MCMM). The controller configuration information 252 may include centralized multicast group membership information 260

The multicast management module 258 may receive multicast group member information from the packet forwarding systems 103, store the multicast group member information and other information as centralized multicast group membership information 260, and invoke the topology module 256 for a possible configuration/reconfiguration of one or more multicast trees. Accordingly, the centralized multicast group membership information 260 may be utilized as persistent storage for multicast group membership for multicast groups. The centralized multicast group membership information 260 may be stored at the controller server 218 responsive to receiving multicast group member information, as described below.

Multicast Tree

The topology module 256 may execute one or more algorithms (e.g., shortest path tree) based on the functional topology of a network, as registered in the centralized multicast topology information 254, and on the multicast group membership, as registered in the centralized multicast group membership information 260, to identify and configure a multicast tree for a multicast group. The topology module 256 may iterate the above-described multicast tree generation for each of the multicast groups. The topology module 256, executing by itself at the controller server 218, replaces the PIM to generate a multicast tree for a multicast group that spans one or more subnetworks, according to an embodiment.

Centralized Multicast Topology Information

The topology module 256 may execute to utilize a link layer discover protocol (e.g., LLDP) to discover packet forwarding systems 103 (e.g., router) in a network, such as the network illustrated in system 200 in FIG. 2A. Further, the topology module 256 may execute to utilize the link layer discover protocol (e.g., LLDP) to discover communication links 107 (e.g., router) in the network and the specific ports on packet forwarding systems 103 to which the communication links 107 are connected. For example, the packet forwarding systems 103 may respond to the probing (e.g., LDDP) by generating and communicating topographic status information that describes the packet forwarding systems 103 in a network, the communication links 107 in the network, and a status (e.g., OK, FAIL) for each of the communication links 107 in the network. The topographic status information may further describe the existence of a packet forwarding system 103 that is not reachable and/or the existence of a communication link 107 that is non-functional. Accordingly, the topology module 256 may execute to generate centralized multicast topology information 254 that describes a functional topology for a network. For example, the topology module 256 receives topographic status information that describes the functional elements in a network (e.g., functional packet forwarding systems 103, communication links 107, etc.) and, in accordance with identification of the functional elements in the network, identifies a functional topology for a network.

FIG. 3A is a block diagram illustrating multicast group membership information 300, according to an example embodiment. The multicast group membership information 300 describes membership (e.g., "JOIN", "LEAVE") of an end-host 109 for one or more multicast groups in a network. The multicast group membership information 300 may be received over a communication link 107/network path 266, at the controller server 218, from a packet forwarding system 103. The multicast group membership information 300 may be embodied as poll information 302, configuration information 304, or access information 306.

FIG. 3B is a block diagram illustrating poll information 302, according to an example embodiment. The poll information 302 describes membership (e.g., "JOIN"s) of an end-host 109 in one or more multicast groups at a packet forwarding system 103. The poll information 302 is communicated by an end-host 109 to a packet forwarding system 103 responsive to the end-host 109 receiving a query for the poll information 302. The poll information 302 includes port information 320 including a port identifier that identifies the port that responds to the query, and one or more "JOIN" registrations 322.

FIG. 3C is a block diagram illustrating a "JOIN" registration 322, according to an example embodiment. The "JOIN" registration 322 describes multicast membership(s) (e.g., "JOIN"s). Each "JOIN" registration 322 includes virtual local area network (VLAN) information 324 and multicast group information 326. The VLAN information 324 may include a VLAN identifier (e.g., "VLAN 10") that uniquely identifies a VLAN from multiple VLANs. The multicast group information 326 may include a multicast group identifier that uniquely identifies a multicast group from multiple multicast groups in a network comprised of multiple subnetworks.

Figure 3D:
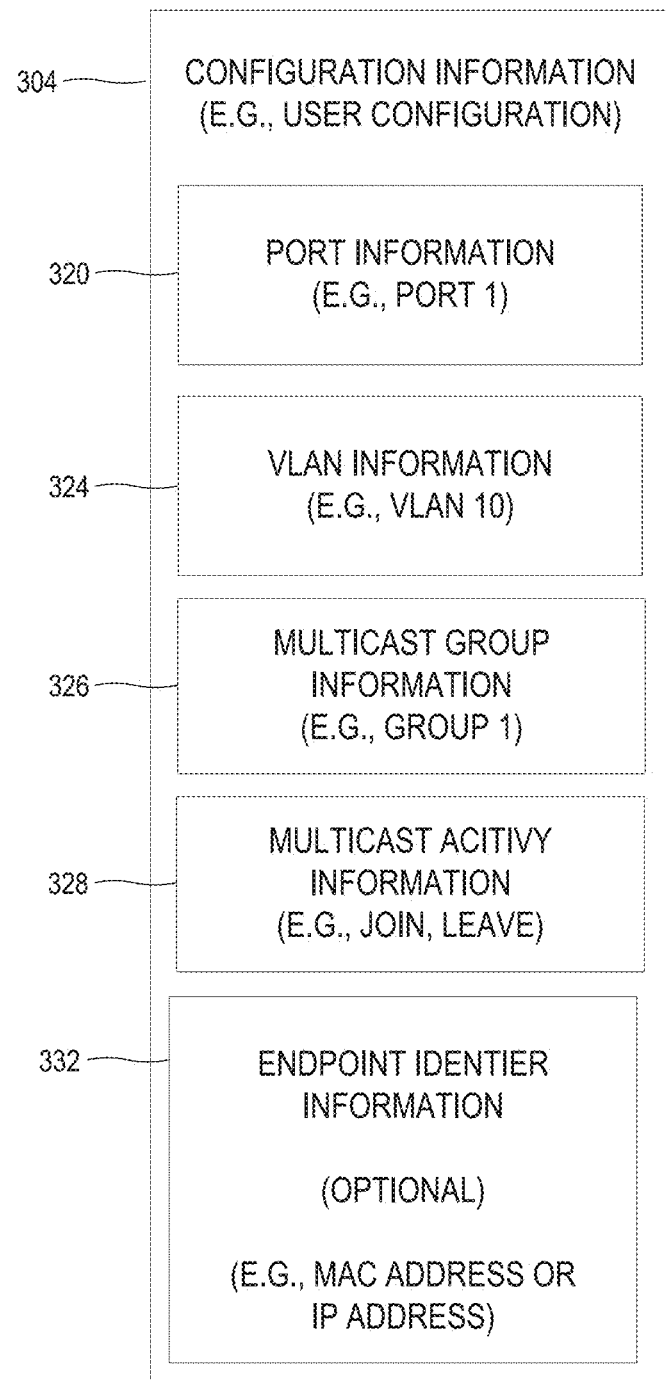
FIG. 3D is a block diagram illustrating configuration information, according to an example embodiment.

FIG. 3D is a block diagram illustrating configuration information 304, according to an example embodiment. The configuration information 304 describes the configuration of a single multicast membership (e.g., "JOIN"/"LEAVE") as entered via a configuration command at a packet forwarding system 103 (e.g., router). The configuration information 304 may include port information 320, VLAN information 324, and multicast group information 326, all as previously described. The configuration information 304 further includes multicast activity information 328 and endpoint identifier information 332. The multicast activity information 328 signifies whether the multicast membership being presented by the configuration information 304 is to "JOIN" or "LEAVE" the indicated multicast group. The endpoint identifier information 332 is optional. The endpoint identifier information 332 includes an endpoint identifier that identifies an endpoint as utilizing the multicast service. For example, the endpoint identifier information 332 may include an endpoint identifier that identifies an Internet Protocol Address (e.g., IP address) or a Media Access control address (MAC address). An IP address is a numerical label assigned to each device (e.g., computer, printer) participating in a network that uses Internet Protocol for communication. A MAC address, also called a physical address, of a computer is a unique identifier assigned to network interfaces for communications on a physical network segment. MAC addresses are used as a network address for most IEEE 802 network technologies, including Ethernet and WiFi.

Figure 3E:
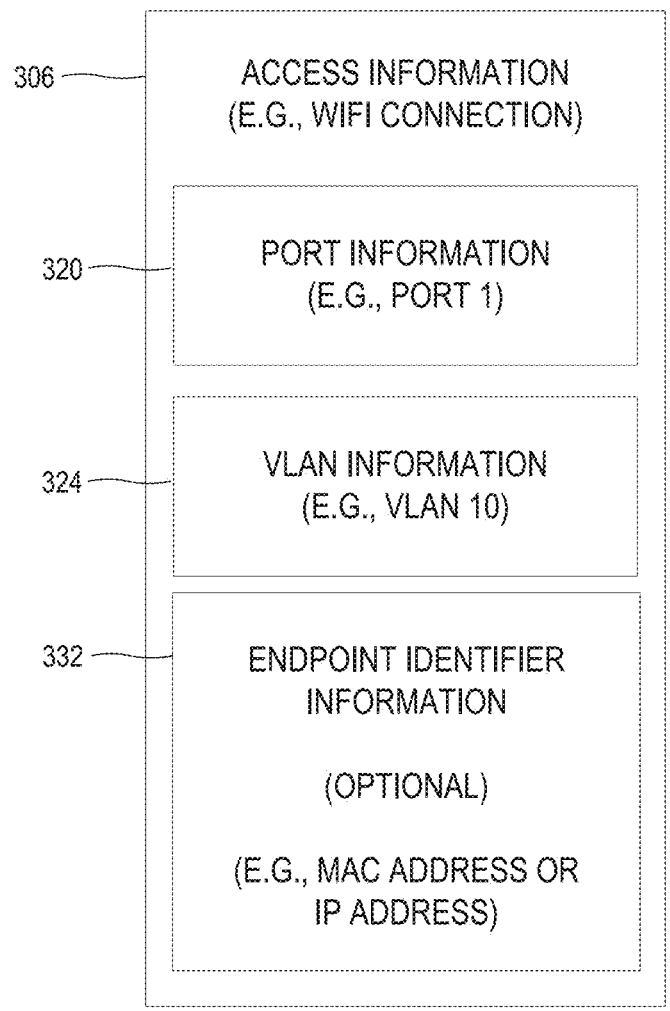
FIG. 3E is a block diagram illustrating access information, according to an example embodiment.

FIG. 3E is a block diagram illustrating access information 306, according to an example embodiment. The access information 306 includes port information 320, VLAN information 324, and endpoint identifier information 332, all as previously described.

FIG. 4A is a block diagram illustrating centralized multicast group membership information 260, according to an example embodiment. The centralized multicast group membership information 260 is used to store multicast group membership at a controller server 218. The centralized multicast group membership information 260 may include one or more multicast information elements 330, each of which registers a single multicast group membership.

FIG. 4B is a block diagram illustrating a multicast information element 330, according to an example embodiment. The multicast information element 330 registers a single multicast group membership on a network. The multicast information element 330 may include node information 321 including a node identifier that, for example, uniquely identifies a packet forwarding system 103 in a network, VLAN information 324 including a VLAN identifier that uniquely identifies a VLAN in a network, port information 320 including a port identifier that uniquely identifies a port on a packet forwarding system 103, multicast group information 326 including a multicast group identifier that uniquely identifies a multicast group and, optionally, endpoint identifier information 332 including an endpoint identifier that uniquely identifies an endpoint (e.g., MAC address, IP address, etc.).

Figure 5A:
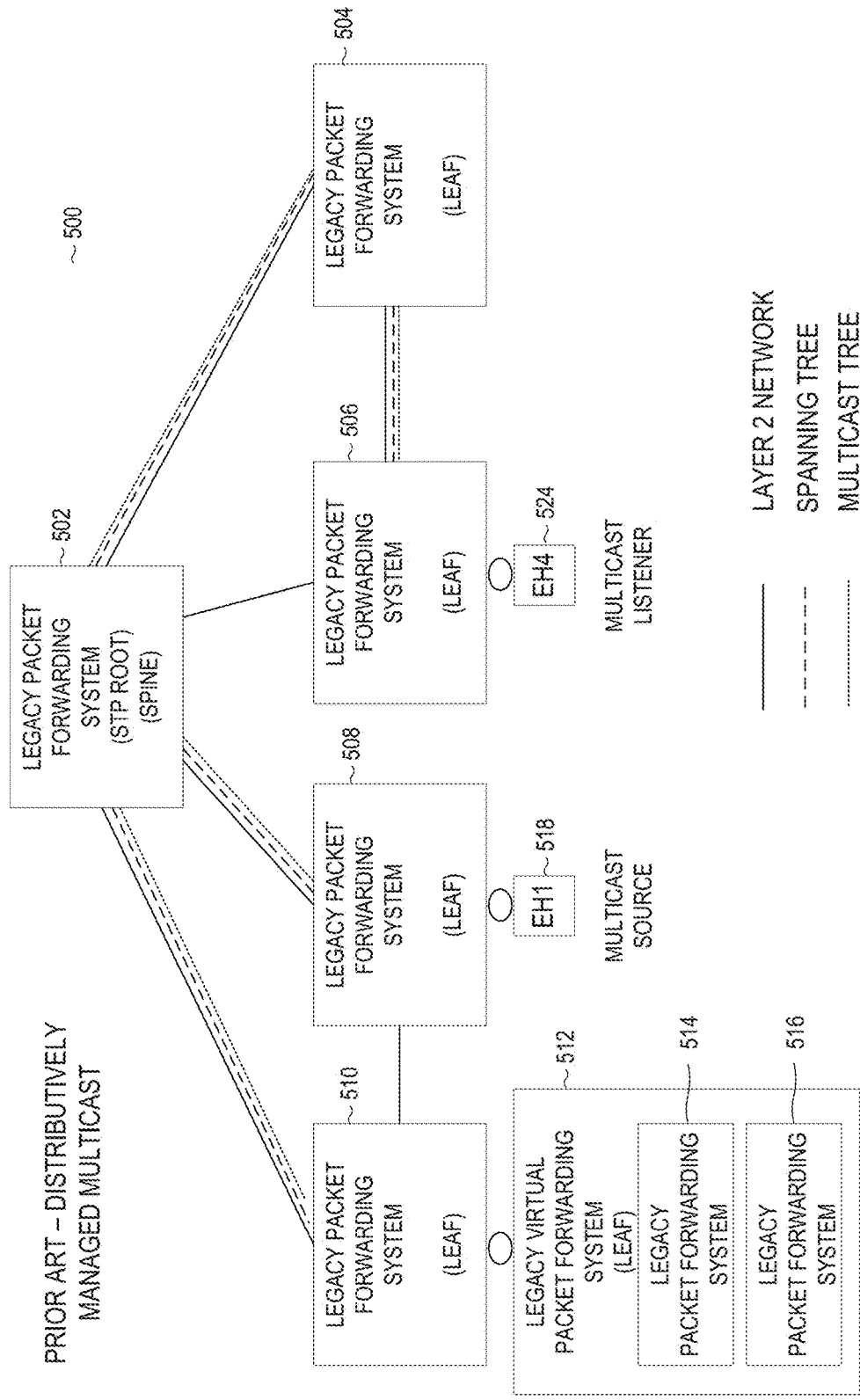
FIG. 5A is a block diagram illustrating a legacy network, according to an example embodiment.

FIG. 5A is a block diagram illustrating a legacy network 500, according to an example embodiment. The legacy network 500 is found in the prior art. The legacy network 500 utilizes a distributive control mechanism for managing multicast services including a distributive control mechanism for selecting a multicast tree. The legacy network 500 may exhibit distributive control by utilizing IGMP, executing at each legacy packet forwarding system 101, to select a particular multicast tree from a set of candidate multicast trees, each of which are "well formed" (e.g., each candidate multicast tree is a loop-free path enabling multicast messaging for all members of a multicast group). Further, the legacy network 500 exhibits distributive control, according to one embodiment, by utilizing IGMP, executing at each legacy packet forwarding system 101, to converge on a particular multicast tree from the set of candidate multicast trees. Multicast tree generation is responsive to registration of a multicast group membership (e.g., "JOIN" or "LEAVE"). Accordingly, any change in multicast group membership invokes the distributive control mechanism for multicast tree generation at each of the legacy packet forwarding systems 101 in the legacy network 500 and the legacy subnetworks that comprise the legacy network 500.

The legacy network 500 includes legacy packet forwarding systems 502, 504, 506, 508, 510, (e.g., physical switches) and a legacy virtual packet forwarding system 512 (e.g., virtual switch). The legacy network 500 exhibits a spine and leaf architecture where the legacy packet forwarding system 502 operates as a spine node providing service to leaf nodes and legacy packet forwarding systems 504, 506, 508, and 510. The legacy packet forwarding systems 504, 506, 508, and 510 operate as leaf nodes providing service to end-hosts 109 and legacy virtual packet forwarding system 512 that, in turn, provides service to end-hosts 109. The legacy virtual packet forwarding system 512 is a logical switch generated by the controller server 218 (not shown). The legacy virtual packet forwarding system 512 may be comprised of one or more legacy packet forwarding systems 101 (e.g., physical switches) and provides a mechanism whereby multiple legal entities may share physical resources (e.g., legacy packet forwarding systems) (e.g., physical switches). With respect to multicast, a legacy packet forwarding system 101 (e.g., physical switch) logically connects to a legacy virtual packet forwarding system 512 (e.g., virtual switch) as a legacy packet forwarding system 101 (e.g., physical switches) connects to an end-host 109.

The legacy network 500 includes an end-host 518 (e.g., EH1) being serviced by legacy packet forwarding system 508, an end-host 520 (e.g., EH2) and an end-host 522 (e.g., EH3) that are respectively being serviced by legacy virtual packet forwarding system 512, and an end-host 524 (e.g., EH4) being serviced by legacy packet forwarding system 506. The legacy network 500 includes a multicast tree originating at legacy packet forwarding system 502 and including three branches including a first branch connecting legacy packet forwarding system 506 via legacy packet forwarding system 504; a second branch connecting legacy packet forwarding system 508; and a third branch connecting legacy packet forwarding system 510.

Distributive Multicast Control—"Stretch" and "Stress"

The network parameters "stretch" and "stress" may be utilized to quantify the efficiency of a multicast network. For example, the network parameters "stretch" and "stress" may be used to compare the efficiencies of a particular multicast network with an optimal multicast network. The network parameter "stretch" is a hop count(s) that counts the hops (e.g., skipping from one node to the next) as measured from a source of a multicast message (e.g., end-host 109) to a destination of the multicast message (e.g., end-host 109). Accordingly, the network parameter for "stretch" may be used to compare multicast tree generation in two networks. The network parameter "stress" is the number of identical packets communicated over the same link.

The legacy network 500 illustrates a "stretch" of three hops for a multicast message originating from end-host 518 (e.g., EH1) and terminating at end-host 524 (e.g., EH4). For example, a multicast message originating from end-host 518 (e.g., EH1) is received by legacy packet forwarding system 508 that, in turn, multicasts the message over the multicast tree to legacy packet forwarding system 502 (e.g., hop 1) that, in turn, multicasts the message over the multicast tree to legacy packet forwarding system 504 (e.g., hop 2) that, in turn, multicasts the message over the multicast tree to legacy packet forwarding system 506 (e.g., hop 3) that, in turn, communicates the message to end-host 524 (e.g., EH4).

The legacy network 500 further illustrates a stretch of two hops for a multicast message originating from end-host 518 (e.g., EH1) and terminating at end-host 520 (e.g., EH2). For example, a multicast message originating from end-host 518 (e.g., EH1) is received by legacy packet forwarding system 508 that, in turn, multicasts the message over the multicast tree to legacy packet forwarding system 502 that, in turn, multicasts the message over the multicast tree to legacy packet forwarding system 510 that, in turn communicates the message to legacy virtual packet forwarding system 512 that, in turn, communicates the message to end-host 520 (e.g., EH2).

Figure 5B:
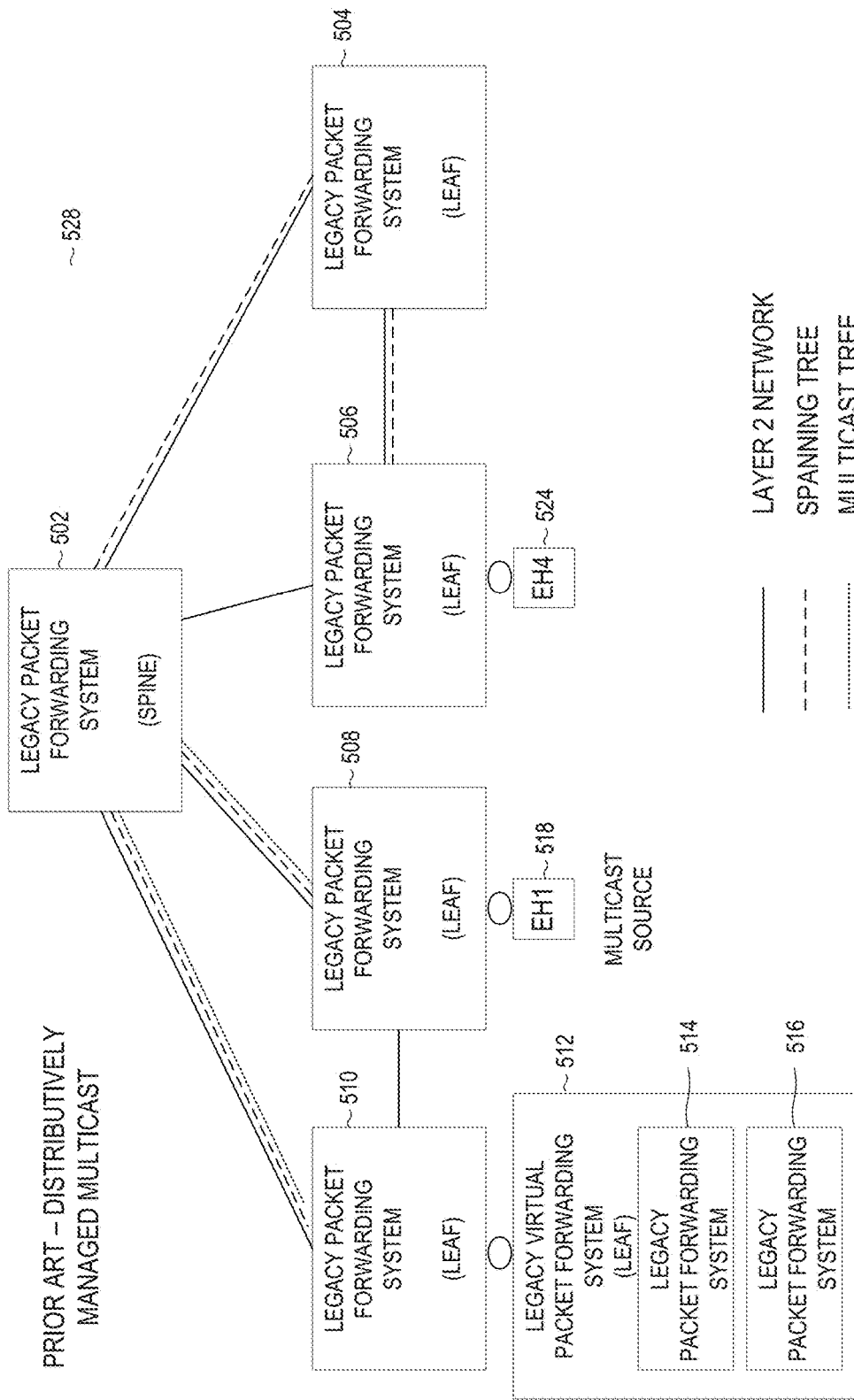
FIG. 5B is a block diagram illustrating a legacy network, according to an example embodiment.

FIG. 5B is a block diagram illustrating a legacy network 528, according to an example embodiment. The legacy network 528 corresponds to the legacy network 500 in FIG. 5A and, accordingly, the same or similar references have been used to indicate the same or similar features unless otherwise indicated.

Distributive Multicast Control Pruning

The legacy network 528 illustrates the end-host 524 (e.g., EH4) as having left the multicast group and the multicast tree being pruned. For example, the legacy packet forwarding system 506, in FIG. 5A, may have previously received poll information 302 indicating a "LEAVE" for EH4. Responsive to receiving the poll information 302, the legacy packet forwarding system 506 may have utilized the spanning tree (e.g., low frequency dashed line on FIG. 5A) to flood the poll information 302 to the other legacy packet forwarding systems 502, 504, 508, and 510 in the legacy network 528. Responsive to receiving the poll information 302, each of the legacy packet forwarding systems 502, 504, 508, and 510 identify, "converge on," and configure a particular multicast tree. The legacy network 528, FIG. 5B, illustrates the multicast tree from legacy network 500 (see FIG. 5A) as being pruned to a two hop multicast tree (returning to FIG. 5B) including the legacy packet forwarding system 508 (e.g., leaf), the legacy packet forwarding system 502 (e.g., spine), and the legacy packet forwarding system 510 (e.g., leaf).

Figure 5C:
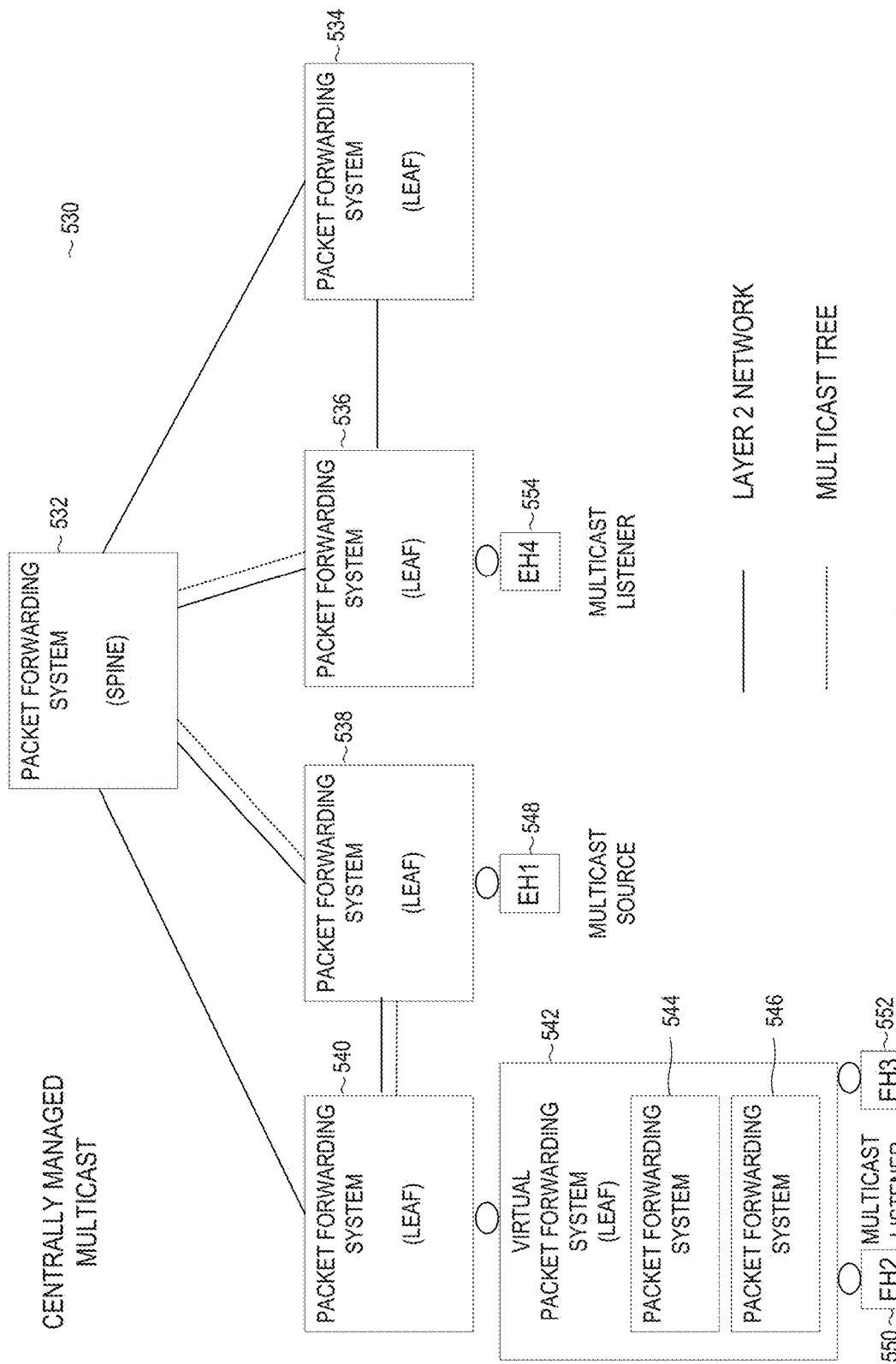
FIG. 5C is a block diagram illustrating a network, according to an example embodiment.

FIG. 5C is a block diagram illustrating a network 530, according to an example embodiment. The network 530 does not utilize a distributive control mechanism for multicast service and is not found in the prior art. Rather, the network 530 utilizes a centralized control mechanism for multicast service. It will further be observed that the network 530 does not include a spanning tree to provide centralized multicast service. Accordingly, the spanning tree is no longer illustrated in the network 530. Rather, the network 530 may exhibit centralized control by utilizing controller modules 250 executing at a controller server 218 (not shown) to receive multicast control information. In addition, the network 530 does not utilize a distributive control mechanism for configuring a multicast tree for communicating multicast traffic. Rather, the network 530 utilizes a centralized control mechanism for multicast traffic including a centralized control mechanism for selecting and configuring a multicast tree. The network 530 may exhibit centralized control by utilizing controller modules 250 (not shown), executing at the controller server 218 (not shown), to select a particular multicast tree from a set of candidate multicast trees, each of which are "well formed" (e.g., each candidate multicast tree is a loop-free path enabling multicast messaging for all members of a multicast group). Further, the network 530 exhibits centralized control by precluding convergence as control of the multicast tree generation and control of the configuration of the multicast tree is centralized and not distributed. Multicast tree generation may be responsive to changes in multicast group membership and/or changes in network topology. Accordingly, any change in multicast group membership or network topology may invoke the centralized control mechanism for multicast tree generation at the controller server 218 and multicast tree configuration from the controller server 218.

The network 530 includes a multicast tree including two branches including a first branch connecting packet forwarding system 532 (spine) to packet forwarding system 536 (leaf) and a second branch connecting packet forwarding system 532 (spine) to packet forwarding system 538 (leaf) that, in turn, connects to packet forwarding system 540 (leaf).

Centralized Multicast Control—"Stretch" and "Stress"

The network 530 illustrates a "stretch" of two hops for a multicast message originating from end-host 548 (e.g., EH1) and terminating at end-host 554 (e.g., EH4). For example, a multicast message originating from end-host 548 (e.g., EH1) is received by packet forwarding system 538 that, in turn, multicasts the message over the multicast tree to packet forwarding system 532 that, in turn, multicasts the message over the multicast tree to packet forwarding system 536 that, in turn, communicates the message to end-host 554 (e.g., EH4).

The network 530 further illustrates a stretch of one hop for a multicast message originating from end-host 548 (e.g., EH1) and terminating at end-host 550 (e.g., EH2). For example, a multicast message originating from end-host 548 (e.g., EH1) is received by packet forwarding system 538 that, in turn, multicasts the message over the multicast tree to packet forwarding system 540 that, in turn communicates the message to virtual packet forwarding system 542 that, in turn, communicates the message to end-host 550 (e.g., EH2).

Figure 5D:
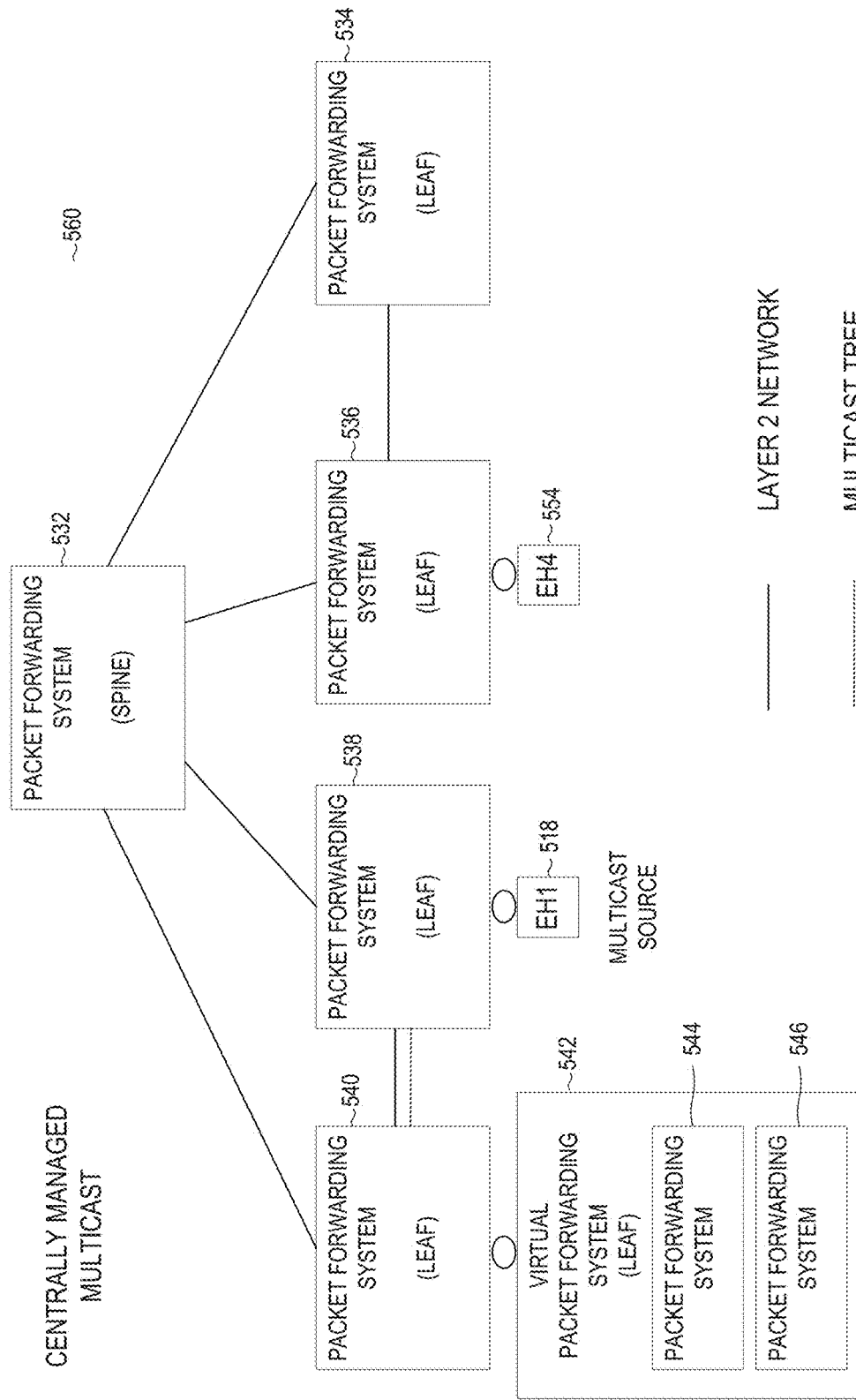
FIG. 5D is a block diagram illustrating a network, according to an example embodiment.

FIG. 5D is a block diagram illustrating a network 560, according to an example embodiment. The network 560 corresponds to the network 530 in FIG. 5C and, accordingly, the same or similar references have been used to indicate the same or similar features unless otherwise indicated.

Centralized Multicast Control—Pruning

The network 560 illustrates the end-host 554 (e.g., EH4) as having left the multicast group and the multicast tree being pruned. For example, starting with the network 530, in FIG. 5C, assume the packet forwarding system 536 receives poll information 302 indicating a "LEAVE" for EH4. Responsive to receiving the poll information 302, the packet forwarding system 536 communicates the poll information 302 to the controller server 218 (not shown). Responsive to receiving the poll information 302, the controller server 218 (not shown) identifies and configures a multicast tree. Returning to FIG. 5D, the network 560 illustrates the multicast tree as a one-hop multicast tree including the packet forwarding system 538 (e.g., leaf) and the packet forwarding system 540 (e.g., leaf) and now excluding the packet forwarding system 532 (e.g., spine).

Figure 5E:
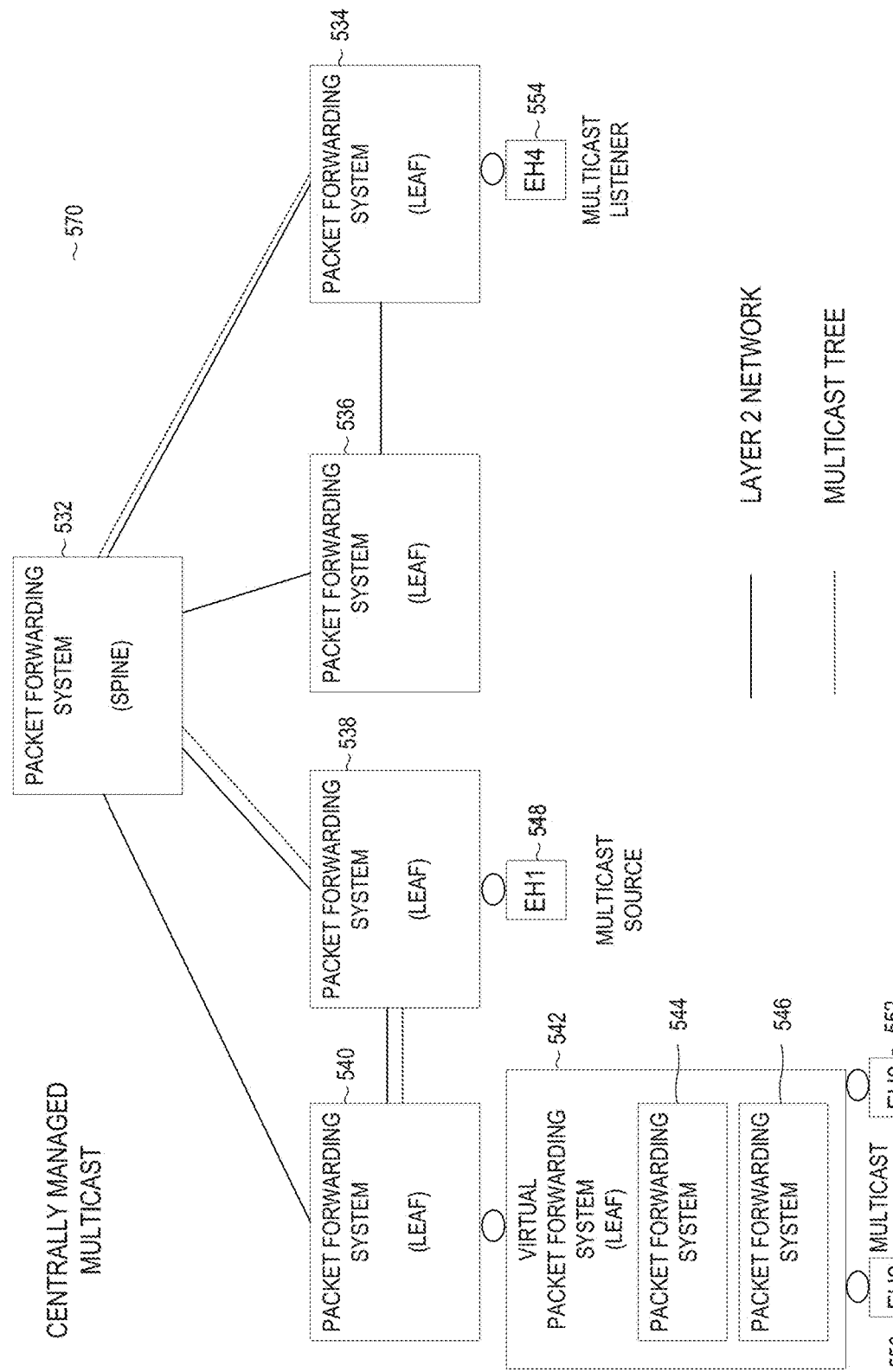
FIG. 5E is a block diagram illustrating a network, according to an example embodiment.

FIG. 5E is a block diagram illustrating a network 570, according to an example embodiment. The network 570 corresponds to the network 530 in FIG. 5C and, accordingly, the same or similar references have been used to indicate the same or similar features unless otherwise indicated.

Centralized Multicast Control—Endpoint Move

The network 570 illustrates end-host 554 (e.g., EH4) as having moved from packet forwarding system 536 (see FIG. 5C) to packet forwarding system 534 and the multicast tree being reconfigured. For example, returning to FIG. 5E, assume the packet forwarding system 534 receives access information 306 including end point identifier information that indicates end host 554 (e.g., EH4) is accessing the system 530 from a port on packet forwarding system 534. Responsive to receiving the access information 306, the packet forwarding system 534, in turn, communicates the access information 306 to the controller server 218 (not shown) that, in turn, utilizes the access information 306 to identify end host 554 (e.g., EH4) as having moved from packet forwarding system 536 to packet forwarding system 534. Responsive to identifying the "move," according to one embodiment, the controller server 218 (not shown) may process a "LEAVE" for the end host 554 (e.g., EH4) on packet forwarding system 536 and a "JOIN" for the end host 554 (e.g., EH4) on packet forwarding system 536, causing the controller server 218 to regenerate and reconfigure the multicast tree, as illustrated in network 570.

Figure 6A:
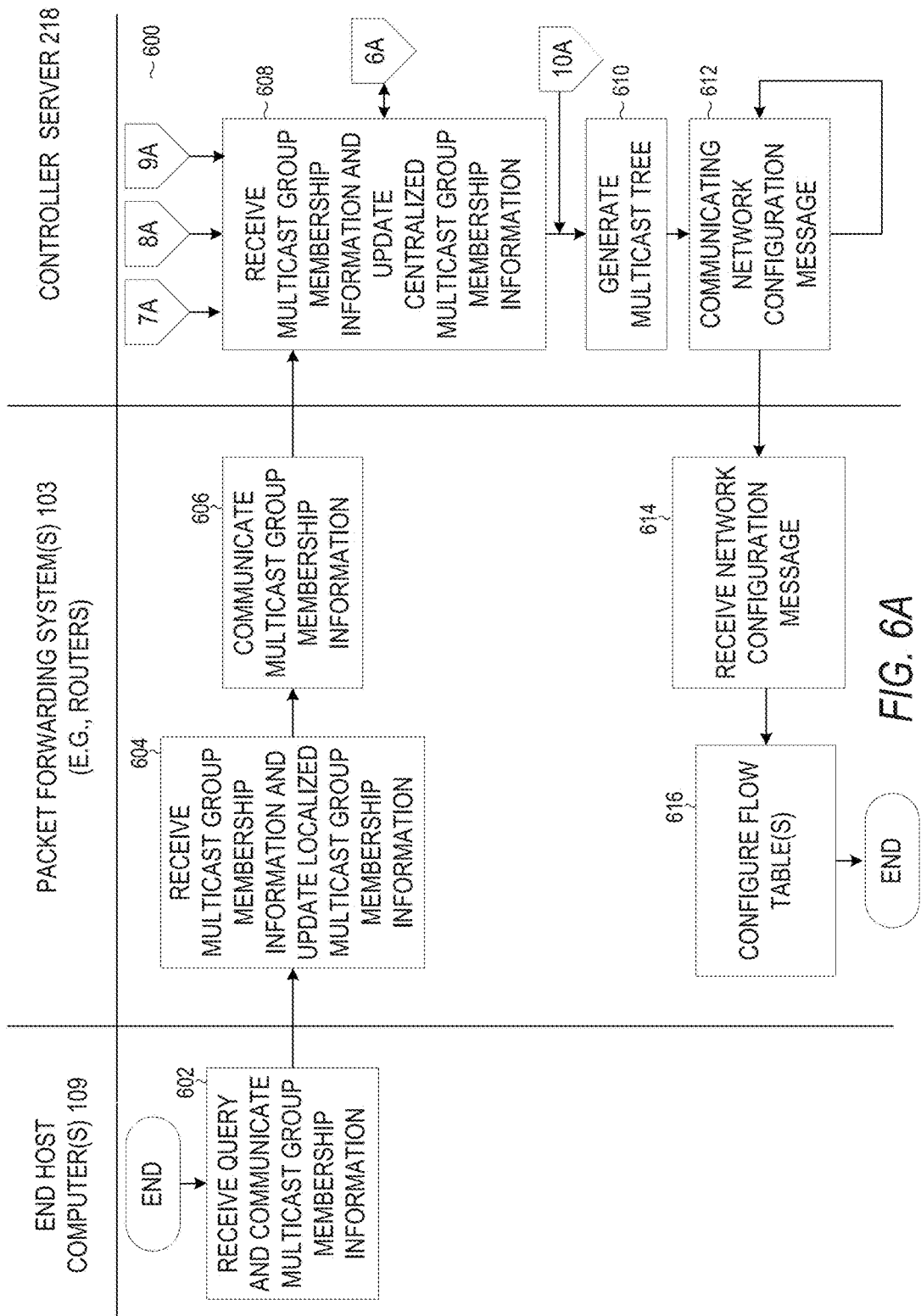
FIG. 6A is a block diagram illustrating a method, according to an example embodiment, to optimize management of a multicast tree.

FIG. 6A is a block diagram illustrating a method 600, according to an example embodiment, to optimize management of a multicast tree. Illustrated on the left are operations performed by one or more end-hosts 109; illustrated in the middle are operations performed by one or more packet forwarding systems 103; and illustrated on the right are operations performed by the controller server 218. The method 600 commences, at operation 602, with an end-host 109 communicating multicast group membership information 300 to a packet forwarding system 103. For example, the operation 602 may have been preceded by the end-host 109 receiving a query for multicast group membership from a packet forwarding system 103. The end-host 109 responds to the query by communicating the multicast group membership information 300 in the form of poll information 302 to the packet forwarding system 103.

At operation 604, at the packet forwarding system 103, the multicast communication module 241 receives the poll information 302 that is associated with a particular port. In addition, the multicast support module 240 identifies a change in multicast interest (e.g., "JOIN"(s) and/or "LEAVE"(s)) for the port and updates the localized multicast group membership information 242 based on the poll information 302 (e.g., FIG. 7 describes operations 602, 604 and 606 in greater detail). For example, the poll information 302 may indicate an interest (e.g., "JOIN") in a multicast group that was previously undiscovered or a disinterest (e.g., "LEAVE") in a multicast group that was previously undiscovered.

At operation 606, the multicast communication module 241 communicates the poll information 302 to the controller server 218. For example, the multicast communication module 241 may communicate the poll information 302 and node information 321 that identifies the packet forwarding system 103 to the controller server 218.

At operation 608, the multicast management module 258, at the controller server 218, may receive the multicast group membership information 300 and update the centralized multicast group membership information 260 based on the multicast group membership information 300. The multicast group membership information 300 may be comprised of poll information 302, configuration information 304, or access information 306. The multicast group membership information 300 may be comprised of poll information 302 entering operation 608 from operation 606 or from off-page connector "7A." The multicast group membership information 300 may be comprised of configuration information 304 entering operation 608 from off-page connector "8A." The multicast group membership information 300 may be comprised of access information 306 entering operation 608 from off-page connector "9A."

Continuing with operation 608, the multicast communication module 241 updates the centralized multicast group membership information 260 based on the multicast group membership information 300. For example, the multicast management module 258 may add (e.g., "JOIN") or purge (e.g., "LEAVE") one or more multicast information elements 330 from the centralized multicast group membership information 260 based on the type of multicast group membership information 300.

Poll Information

Figure 6B:
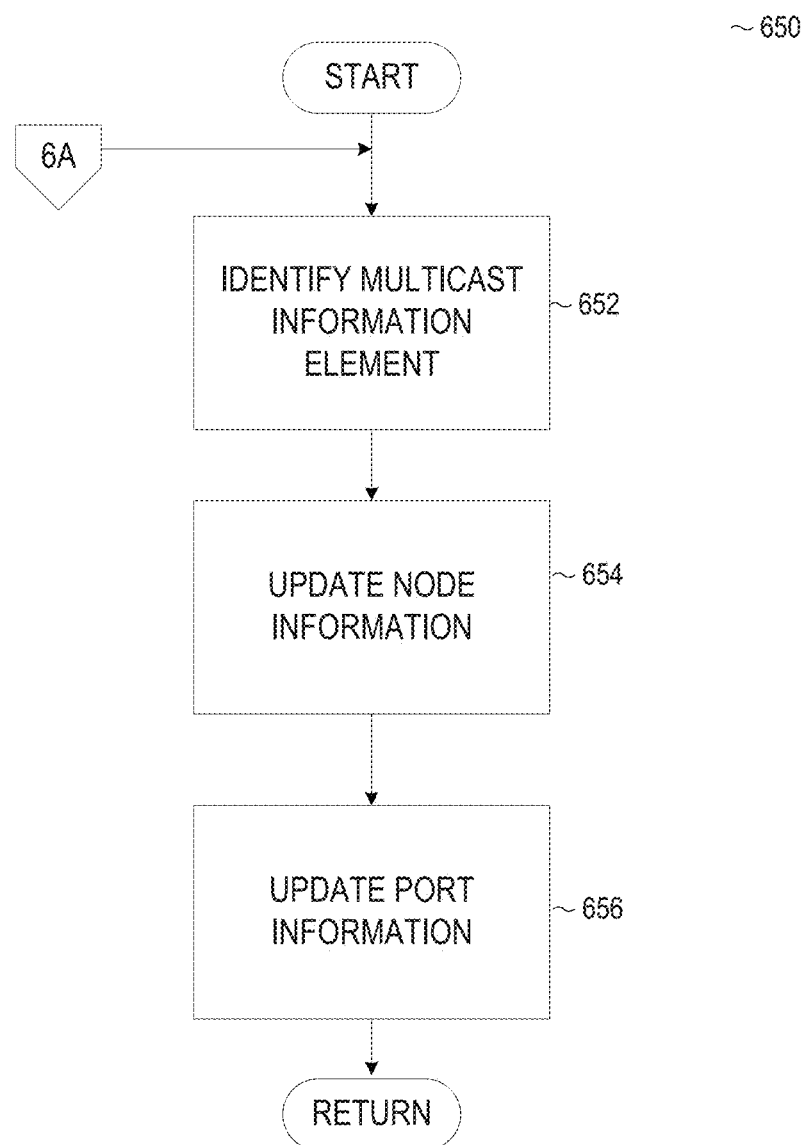
FIG. 6B is a block diagram illustrating a method, according to an example embodiment, to update a multicast information element based on access information.
Figure 7:
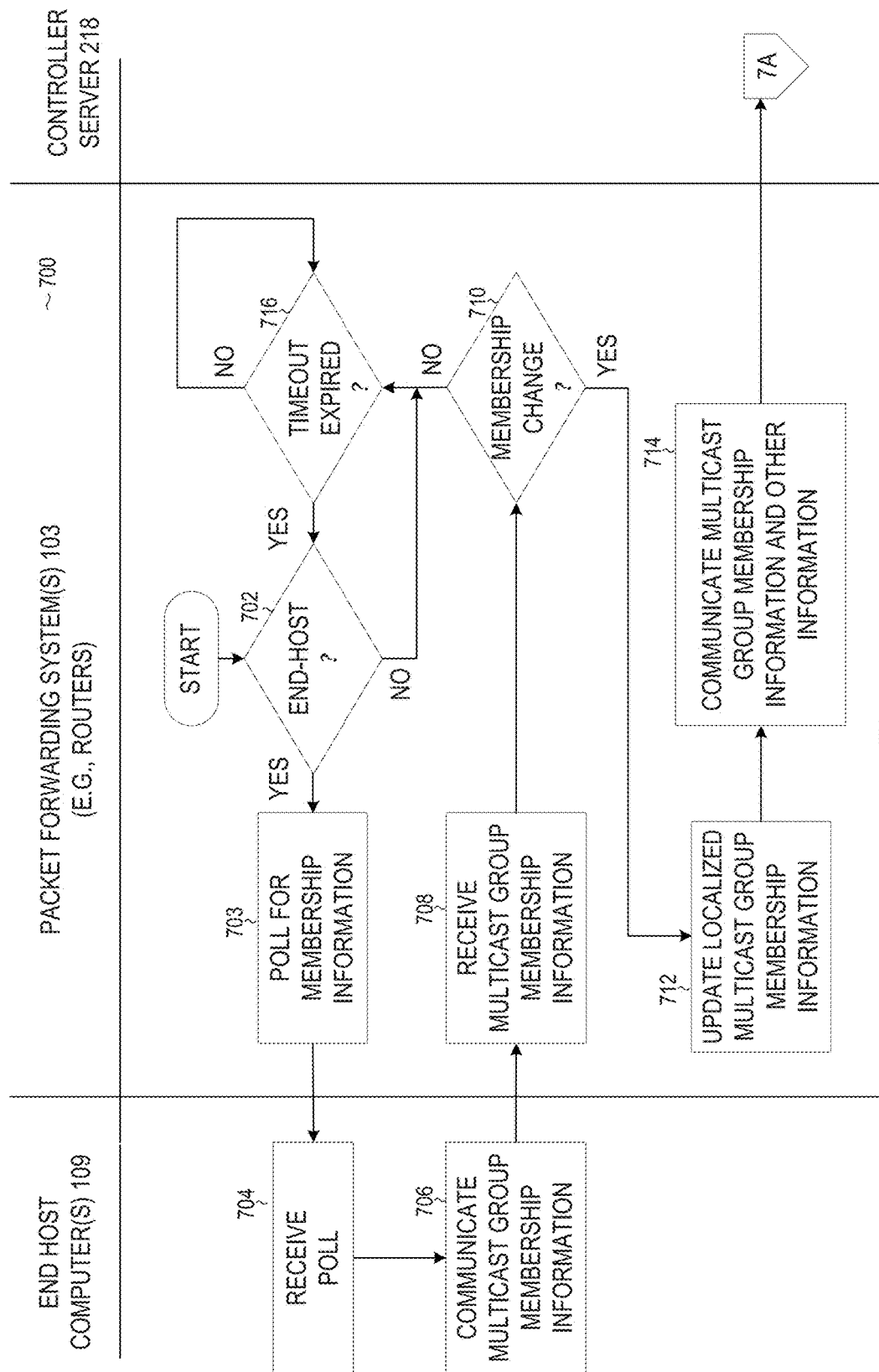
FIG. 7 is a block diagram illustrating a method, according to an example embodiment, process polling information.

If, for example, the multicast group membership information 300 comprises poll information 302, then one or more multicast information elements 330 may be purged and/or added to the centralized multicast group membership information 260 in accordance with the poll information 302 and other information, as described in operation 714 on FIG. 7. Returning to FIG. 6B, Recall that poll information 302 that does not result in a state change is filtered at the packet forwarding system 103.

Configuration Information

If for example, the multicast group membership information 300 comprises configuration information 304, then a multicast information element 330 may be added to/purged from the centralized multicast group membership information 260 responsive to the multicast activity information 328 in the configuration information 304. Recall that the configuration information 304 may include endpoint identifier information 332.

Access Information

If for example, if the multicast group membership information 300 comprises access information 306, then a multicast information element 330 may be logically purged from (e.g., "LEAVE") the centralized multicast group membership information 260 and logically added to (e.g., "JOIN") the centralized multicast group membership information 260 in accordance with the access information 306. For example, the multicast management module 258 may process the "LEAVE" and "JOIN" operations for the endpoint identified in the access information 306 to register the endpoint as having moved from one access point on a network to another access point on the network. According to one embodiment, the multicast management module 258 may process the access information 306 in accordance with the method 650, as described in FIG. 6B, as indicted with the off-page connector "6A."

Returning to FIG. 6A, at operation 610, the topology module 256, at the controller server 218, generates (or regenerates) a multicast tree based on the centralized multicast group membership information 260 and the centralized multicast topology information 254. The operation 610 may be entered from operation 608 or from off-page connector "10A." Entering from off-page connector "10A" is responsive to receipt of topographic status information as illustrated on FIG. 10.

Returning to FIG. 6A, the topology module 256 may generate the one or more multicast trees based on the centralized multicast group membership information 260 as updated by the multicast group membership information 300. The topology module 256 may generate one or more multicast trees responsive to adding/purging multicast information elements 330 for one or more multicast groups from the centralized multicast group membership information 260. For example, the topology module 256 may generate a multicast tree to receive multicast traffic for a particular multicast group at an identified packet forwarding system 103 responsive to identifying a "JOIN" for the multicast group at the packet forwarding system 103. Further for example, the topology module 256 may generate a multicast tree that no longer receives multicast traffic for a particular multicast group at an identified packet forwarding system 103 responsive to identifying a "LEAVE" for a multicast group at the packet forwarding system 103. Further, it will be appreciated that PIM service for routing multicast traffic across different VLANs is no longer necessary as the method 600 provides for multicast service across subnetworks and, to this end, the operation 610 generates a single multicast tree for a multicast group that spans two or more subnetworks.

The topology module 256 may further generate one or more multicast trees based on the centralized multicast topology information 254, as updated by receipt of topographic status information (e.g., entering operation 610 via off-page connector "10A"). For example, the topology module 256 may generate a multicast tree by identifying a loop-free shortest path in a network that is described by the centralized multicast topology information 254. Accordingly, the centralized multicast topology information 254 may include status for communication links 107 that are not failed and status of communication links 107 connecting all of the packet forwarding systems 103 in the network sufficient to provide multicast service for the multicast members in the multicast group as identified based on the centralized multicast group membership information 260. Further, the topology module 256 may generate a multicast tree that spans two or more subnetworks (e.g., LAN A, LAN B, etc.) based on the centralized multicast topology information 254 and the centralized multicast group membership information 260.

At operation 612, the multicast management module 258 communicates one or more network configuration messages to packet forwarding system(s) 103 to enable respective portions of one or more multicast trees at the packet forwarding system(s) 103. For example, the multicast management module 258 may communicate one or more network configuration messages to configure packet processing circuitry at packet forwarding systems 103 to respectively enable a portion of a multicast tree at the packet forwarding system(s) 103. The multicast management module 258 communicates one or more network configuration messages based on the centralized multicast group membership information 260 indicating interest in a particular multicast group, and the centralized multicast topology information 254. Further, the multicast management module 258 may enable the multicast tree for a multicast group that spans VLAN boundaries. For example, the topology module 256 may enable portions of a multicast tree for a multicast group that is serviced by different subnetworks (e.g., VLANs). Accordingly, it will be appreciated that PIM service for routing multicast traffic across different VLANs is no longer necessary as the method 600 provides for multicast service across subnetworks and, to this end, the operation 612 enables a single multicast tree for a multicast group that spans two or more subnetworks.

At operation 614, the multicast communication module 241 receives a network configuration message from the controller server 218, and at operation 616, the multicast support module 240 configures the packet processing circuitry at packet forwarding system(s) 103 in accordance with the configuration message. For example, the configuration message may enable a portion of a multicast tree for a multicast group at a particular packet forwarding system 103.

FIG. 6B is a block diagram illustrating a method 650, according to an example embodiment, to update a multicast information element based on access information. The method 650 may be entered from operation 608 on FIG. 6A. At operation, 652, the multicast management module 258 may identify a multicast information element 330 in the centralized multicast group membership information 260 based on the endpoint identifier information 332 in the access information 306. For example, the multicast management module 258 may identify the multicast information element 330 by matching the endpoint identifier information 332 in the access information 306 with the endpoint identifier information 332 in the centralized multicast group membership information 260. At operation, 654, the multicast management module 258 may update the node information 321 in the multicast information element 330 that was identified. For example, the multicast management module 258 may update the node information 321 based on a node identifier that identified the packet forwarding system 103 that identified the interaction with the end-host 109 and communicated the group membership information to the controller server 218, as described in FIG. 9. Returning to FIG. 6B, at operation, 656, the multicast management module 258 may update the port information 320 in the multicast information element 330 that was identified. For example, the multicast management module 258 may update the port information 320 based on a port information in the access information 306 that was communicated to the controller server 218, as described in FIG. 9.

FIG. 7 is a block diagram illustrating a method 700, according to an example embodiment, to process polling information. The method 700 describes, in greater detail and wider context, the operations 602, 604, and 606 previously illustrated on FIG. 6A. Returning to FIG. 7, illustrated on the left are operations performed by one or more end-hosts 109; illustrated in the middle are operations performed by one or more packet forwarding systems 103; and illustrated on the right are operations performed by the controller server 218. The method 700 commences at decision operation 702, with the multicast communication module 241, at the packet forwarding system(s) 103, identifying whether an end-host 109 is connected to a port. For example, the multicast communication module 241 may identify "port one" on the packet forwarding system(s) 103 as being connected to an end-host 109 and not a packet forwarding system(s) 103 (or some device other than an end-host 109). The multicast communication module 241 may identify whether an end-host 109 is connected via a particular port in different ways. According to one embodiment, the multicast communication module 241 may identify whether a port on the packet forwarding system(s) 103 is being utilized for communicating with an end-host 109 by communicating a query out the port requesting a status identifying the type of device that is connected (e.g., end-host 109 or a packet forwarding system 103, etc.) to the packet forwarding system 103. In another embodiment, the multicast communication module 241 may read the status from a table stored in memory at the packet forwarding system 103. In another embodiment, the multicast communication module 241 may query the controller server 218 for the status. If the multicast communication module identifies a status as signifying the port is connected to an end-host 109 then the multicast communication module 241 branches to operation 703. Otherwise the multicast does not branch to operation 703. The multicast communication module 241 iterates decision operation 702 for all of the ports on the packet forwarding system 103, according to an embodiment. Responsive to identifying all of the ports have been processed at decision operation 702, according to an embodiment, the multicast communication module 241 sets a timeout (e.g., 500 milliseconds) and branches to decision operation 716.

At operation 703 the multicast communication module 241 polls the end-host 109 for poll information 302. For example, the multicast communication module 241 may communicate a query over the identified port requesting poll information 302.

At operation 704, the end-host 109 receives the query for multicast interest/member information and, at operation 706, responds to the query by communicating the multicast group membership information 300, in the form of poll information 302, back to the packet forwarding system(s) 103. At operation 708, the multicast communication module 241, at the packet forwarding system(s) 103, receives the poll information 302. At decision operation 710, the multicast support module 240 identifies whether the poll information 302 indicates a change in multicast interest/membership (e.g., "JOIN"(s) and/or "LEAVE"(s)) for the port (e.g., "port one"). For example, the multicast support module 240 (MCSM) may compare the poll information 302 received from the end-host 109 with the localized multicast group membership information 242 that is stored for the port at the packet forwarding system(s) 103 and, responsive to the multicast support module 240 identifying the poll information 302 indicating a status change (e.g., a change in status regarding multicast interest for a member of a multicast group) (e.g., "JOIN" or "LEAVE"), the multicast support module 240 branches to operation 712. Otherwise, a branch is made to decision operation 716.

At operation 712, the multicast communication module 241 (MCCM) updates the localized multicast group membership information 242. For example, the multicast communication module 241 may update the localized multicast group membership information 242 based on poll information 302 indicating an interest in a multicast group as being discovered (e.g., "JOIN") or a disinterest in a multicast group as being discovered (e.g., "LEAVE").

At operation 714, the multicast communication module 241 communicates the poll information 302 and other information to the controller server 218 to register one or more "JOIN" or "LEAVE" operations at the controller server at connector "7A" on FIG. 6A. For example, the multicast communication module 241 may communicate node information 321 and port information 320 in association with one or more join registrations 322 to register one or "JOIN" operations that add corresponding multicast information elements 330 to the centralized multicast group membership information 260. Further for example, the multicast communication module 241 may communicate node information 321 and port information 320 in association with one or more join registrations 322 and a "LEAVE" indicator to register one or more "LEAVE" operations that purge corresponding multicast information elements 330 from the centralized multicast group membership information 260.

At decision operation 716, the multicast communication module 241, at the packet forwarding system(s) 103, branches to execute operation 702 responsive to an expiration of a timeout. For example, responsive to an expiration of five hundred milliseconds timeout, the multicast communication module 241 begins processing at operation 702. Otherwise, the multicast communication module 241 waits at decision operation 716.

Figure 8:
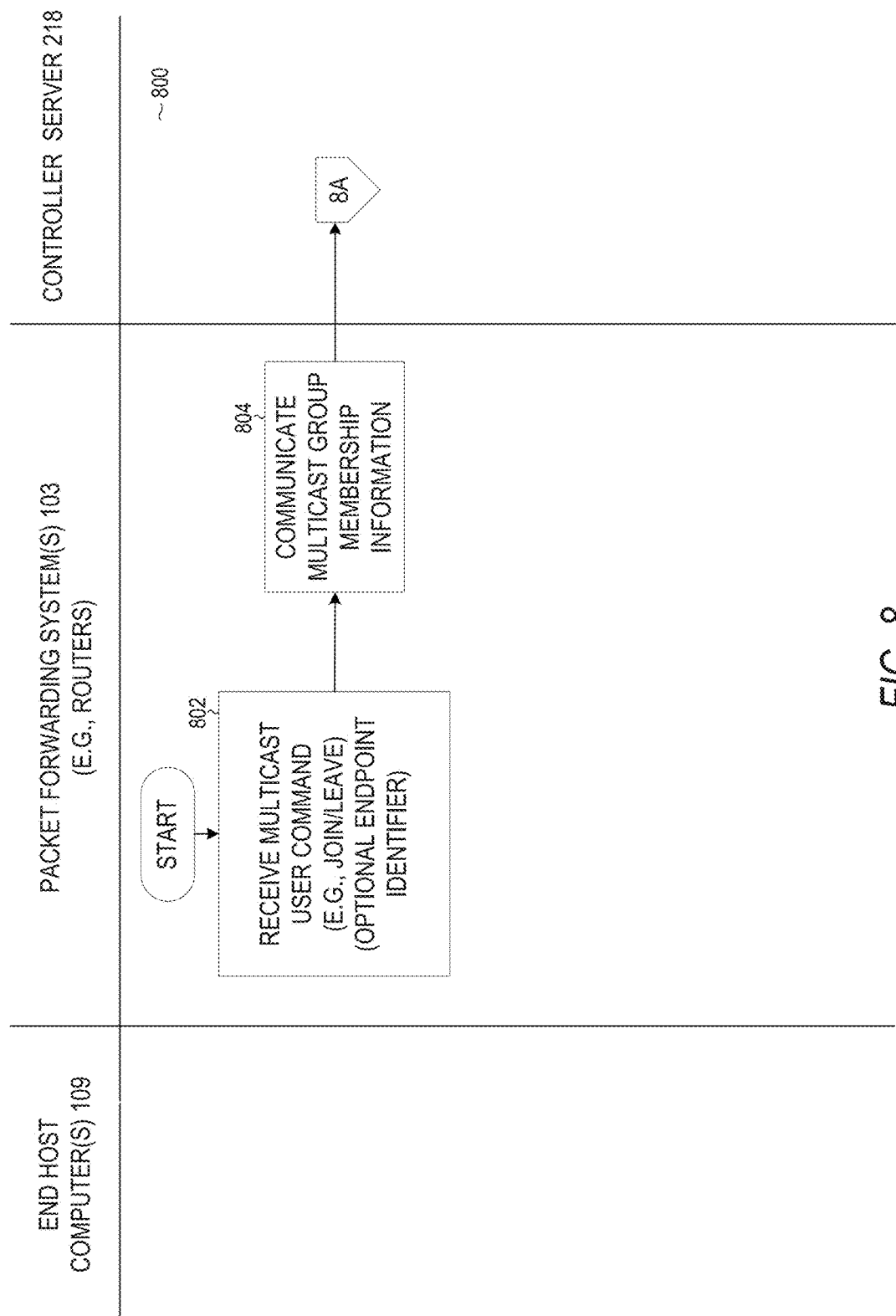
FIG. 8 is a block diagram illustrating a method, according to an example embodiment, to process a configuration command.

FIG. 8 is a block diagram illustrating a method 800, according to an example embodiment, to process a configuration command. Illustrated on the left are operations performed by one or more end-hosts 109; illustrated in the middle are operations performed by one or more packet forwarding systems 103; and illustrated on the right are operations performed by the controller server 218.

The method 800 commences at operation 802, with the multicast communication module 241, at the packet forwarding system(s) 103, receiving user command information. For example, the user command information may include port information 320 identifying a port number, VLAN information 324 identifying a VLAN, multicast group information 326 identifying a multicast group, and multicast activity information 328 identifying a "JOIN" or "LEAVE." Accordingly, the user command information uniquely identifies an access point on a network and an interest to JOIN a particular multicast group or an interest to LEAVE a particular multicast group. In some embodiments, the command information may further include endpoint identifier information 332 that uniquely identifies the end-host 109 from other end-hosts 109. For example, the endpoint identifier information 332 may include a media access control (MAC) address or an Internet Protocol address. Accordingly, the user command information may include endpoint identifier information 332 that uniquely identifies end-host 109 in association with information that identifies an access point on a network.

At operation 804, the multicast communication module 241 communicates the multicast group membership information 300, in the form of configuration information 304, to the controller server 218.

At connector "8A," the controller server 218 receives the configuration information 304 and processing continues on FIG. 6A at operation 608, as previously described. According to another embodiment the user command information may be received directly by the controller server 218.

Figure 9:
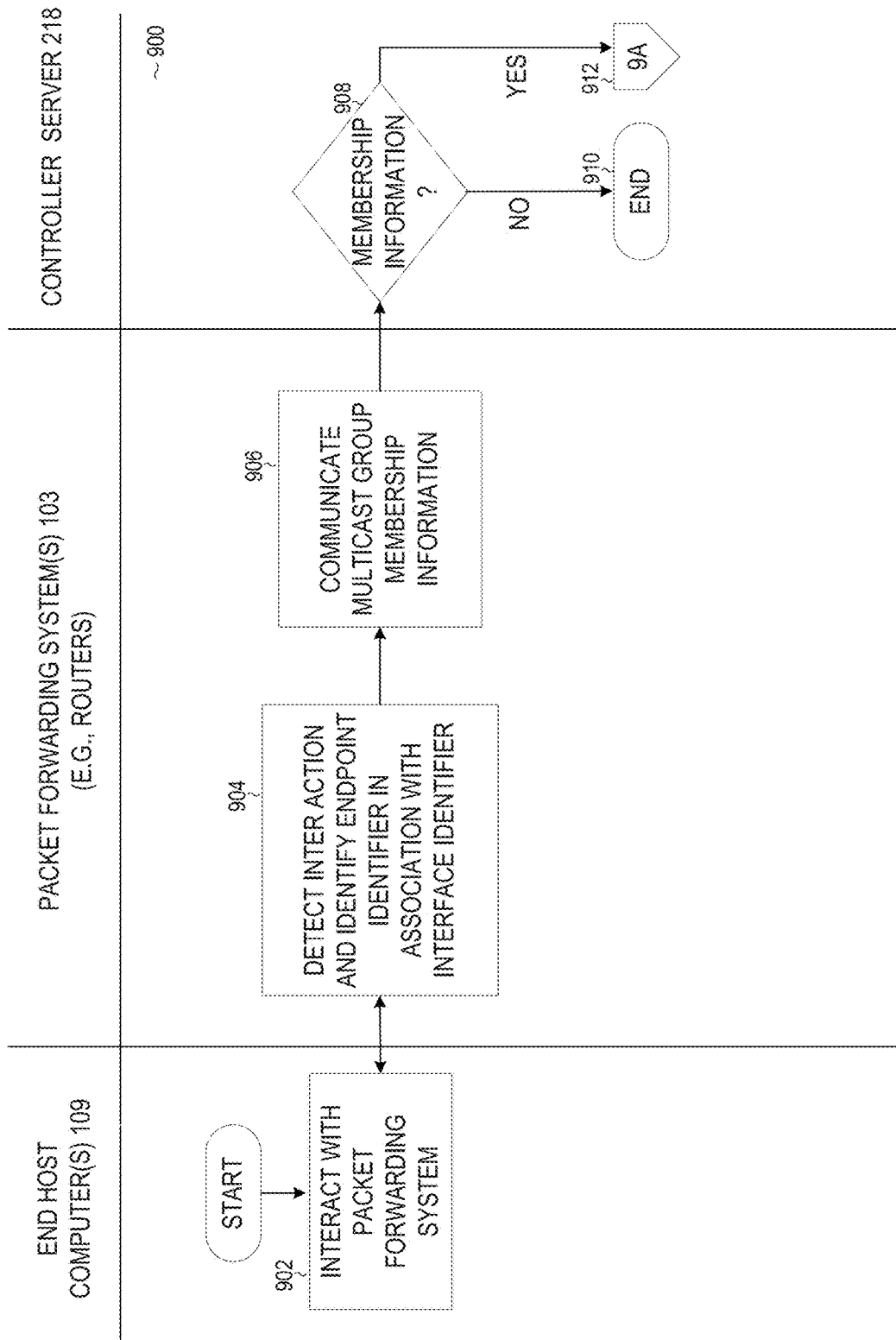
FIG. 9 is a block diagram illustrating a method, according to an example embodiment, to manage an endpoint as a multicast group member.

FIG. 9 is a block diagram illustrating a method 900, according to an example embodiment, to manage an endpoint as a multicast group member. Illustrated on the left are operations performed by one or more end-hosts 109; illustrated in the middle are operations performed by one or more packet forwarding systems 103; and illustrated on the right are operations performed by the controller server 218.

The method 900 commences at operation 902, with an end-host 109 interacting with a packet forwarding system 103. For example, the end-host 109 may be connected to the packet forwarding system 103. Further for example, the end-host 109 may restart, causing the end-host to reconnect to the packet forwarding system 103. Further for example, the end-host 109 may be wireless device that enters or exits a local area network that is serviced by a port on a packet forwarding system 103.

At operation 904, at the packet forwarding system 103, the multicast communication module 241 detects the interaction with the packet forwarding system 103 by identifying an endpoint in association with an access point on a network. For example, the multicast communication module 241 may identify an endpoint identifier that identifies an end-host 109 (e.g., MAC address) in association with an interface identifier (e.g., port number, VLAN number) that identifies an access point on a network.

At operation 906, the multicast communication module 241 communicates the multicast group membership information 300, in the form of access information 306, to the controller server 218. For example, the access information 306 may include node information 321 including a node identifier that identifies the packet forwarding system 103, port information 320 including a port identifier that identifies the port on which the end-host 109 was identified as interacting with packet forwarding system 103, VLAN information 324 including a VLAN identifier that identifies the virtual local area network on which the end-host 109 was identified as interacting with packet forwarding system 103, and endpoint identifier information 332 (e.g., media access control (MAC) address/Internet Protocol address) that identifies the end-host 109.

At decision operation 908, at the controller server 908, the multicast management module 258 identifies whether the access information 306 includes describes endpoint identifier information 332 that identifies a member of a multicast group. For example, the multicast management module 258 may compare the endpoint identifier information 332 in the access information 306 with the endpoint identifier information 332 in each of the multicast information elements 330 in the centralized multicast group membership information 260, and responsive to identifying a match, branch to operation 912. Otherwise, the multicast management module 258 branches to operation 910.

At connector "9A," the controller server 218 processes the multicast group membership information 300, in the form of access information 306, as illustrated on FIG. 6, at operation 608 and as previously described.

Figure 10:
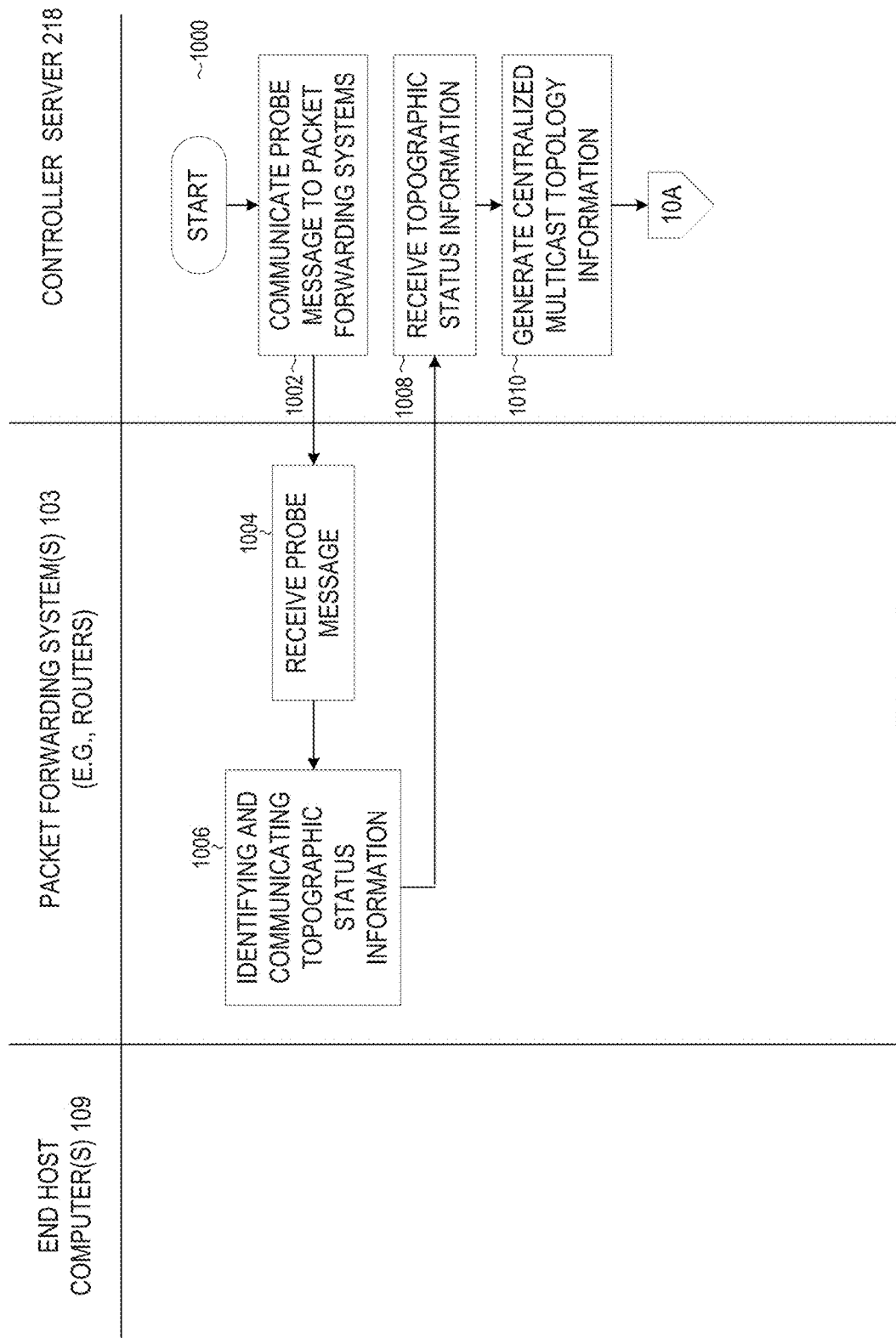
FIG. 10 is a block diagram illustrating a method, according to an example embodiment, to optimize management of centralized multicast topology information.

FIG. 10 is a block diagram illustrating a method 1000, according to an example embodiment, to optimize management of centralized multicast topology information. Illustrated on the left are operations performed by one or more end-hosts 109; illustrated in the middle are operations performed by one or more packet forwarding systems 103; and illustrated on the right are operations performed by the controller server 218.

The method 1000 commences at operation 1002, with the multicast management module 258, at the controller server 218, communicating probe messages to the packet forwarding systems 103 in a network. For example, the multicast management module 258 may send Link Layer Discovery Protocol (LLDP) probe packets through the network to discover the topology of a network.

At operation 1004, at a packet forwarding system 103, the multicast communication module 241 receives a probe message, and at operation 1006 the multicast support module 240 identifies topographic status information and communicates the topographic status information to the controller server 218. For example, the topographic status information may describe the packet forwarding system 103 that received the probe message in association with the communication links 107 that are connected to the packet forwarding system 103. The topographic status information may further describe whether a neighboring packet forwarding system 103 is not reachable via a communication link 107 and/or whether the communication link 107 is failed (e.g., not functional).

At operation 1008, at the controller server 218, the multicast management module 258 receives the topographic status information from one or more packet forwarding systems 103. At operation 1010, the multicast management module 258 generates/updates centralized multicast topology information 254 based on the topographic status information. For example, the topographic status information may indicate a packet forwarding system 103 (e.g., "Node D") as being added to the network including a communication link 107 on "port three" that is failed and a communication link 107 on "port four" that connects the packet forwarding system 103 (e.g., "Node D") to a neighboring packet forwarding system 103 (e.g., "Node C") that was previously registered in the network. Processing continues at off-page connector "10A" on FIG. 6A with the topology module 256 identifying whether one or more multicast trees are updated based on the network topology. For example, the topology module 256 may identify and configure a shortest loop free path for a multicast tree responsive to a network topology being updated with a failed communication link 107 (e.g., communication link does not support communication) or a repaired communication link 107 (e.g., communication now supports communication) or both. Further for example, the topology module 256 may identify and configure multiple multicast trees based on a status change (e.g., failed/repaired) for a single communication link 107.

Figure 11A:
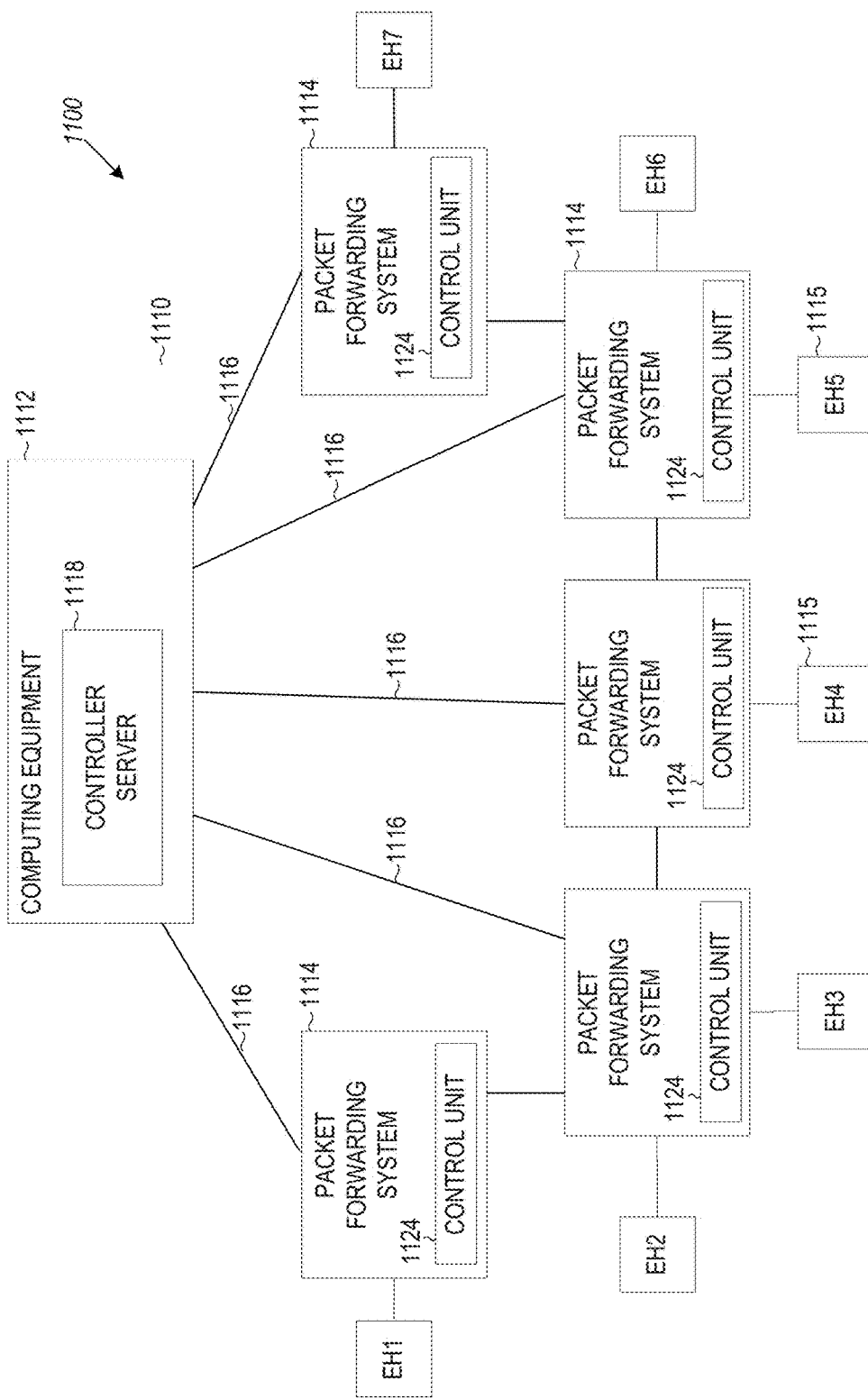
FIG. 11A is a block diagram illustrating a network architecture, according to an example embodiment.

FIG. 11A is a block diagram illustrating a network architecture 1100, according to an example embodiment, to centrally manage multicast traffic, as described in association with FIGS. 2A-2C, FIGS. 3A-3E, FIGS. 4A-4B, FIGS. 5C-5, FIGS. 6A-6B, FIG. 7, FIG. 8, FIG. 9, FIG. 10, and as otherwise described throughout this document. The network architecture 1100 includes a network 1110 providing for centralized control and includes computing equipment 1112 including one or more controller servers, such as controller server 1118, one or more packet forwarding systems 1114, and one or more end hosts 1115. The controller server 1118 is communicatively coupled via network links 1116 to the control units 1124 in the packet forwarding systems 1114 to implement a network configuration and for performing other types of centralized control. The packet forwarding systems 1114 include input-output ports that are utilized to communicatively couple the packet forwarding systems 1114 to other packet forwarding systems 1114 or to the controller server 1118. The packet forwarding systems 1114 further include additional input-output ports that are utilized to communicatively couple the packet forwarding systems 1114 to end hosts 1115 (e.g., EH1, EH2, EH3, etc.). The end hosts 1115 communicate via the packet forwarding systems 1114 with each other. According to another embodiment, the network links 1116 may be embodied as network paths, as described later in this document.

Multi-Vendor Networks

Multi-vendor networks (e.g., network 1110) such as the Internet and the local and regional networks that are coupled to the Internet, rely on switches, such as packet forwarding systems (e.g., packet forwarding system 1114), that are packet-based. These switches, which are sometimes referred to herein as network switches, packet processing systems, or packet forwarding systems (e.g., packet forwarding system 1114) can forward packets based on address information. In this way, data packets that are transmitted by a packet source may be delivered to a packet destination. In network terms, packet sources and destinations are sometimes referred to as end hosts 1115 (e.g., EH1, EH2, EH3, etc.). Examples of end hosts 1115 are personal computers, servers, and other computing equipment such as portable electronic devices that access the network using wired or wireless technologies.

Packet forwarding systems (e.g., network switches) in multi-vendor networks range in capability from relatively small Ethernet switches and wireless access points to large rack-based systems that include multiple line cards, redundant power supplies, and supervisor capabilities. It is not uncommon for networks to include equipment from multiple vendors. Packet forwarding systems (e.g., network switches) from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) (e.g., control unit 1124) into each packet forwarding system (e.g., network switch). A centralized cross-platform controller such as a controller server (e.g., controller server 1118) or distributed controller server may interact with each of the control clients (e.g., control unit 1124) over respective network links (e.g., network links 1116). The use of a cross-platform controller and corresponding controller clients (e.g., control unit 1124) allows potentially disparate network switch equipment to be centrally managed.

Figure 11B:
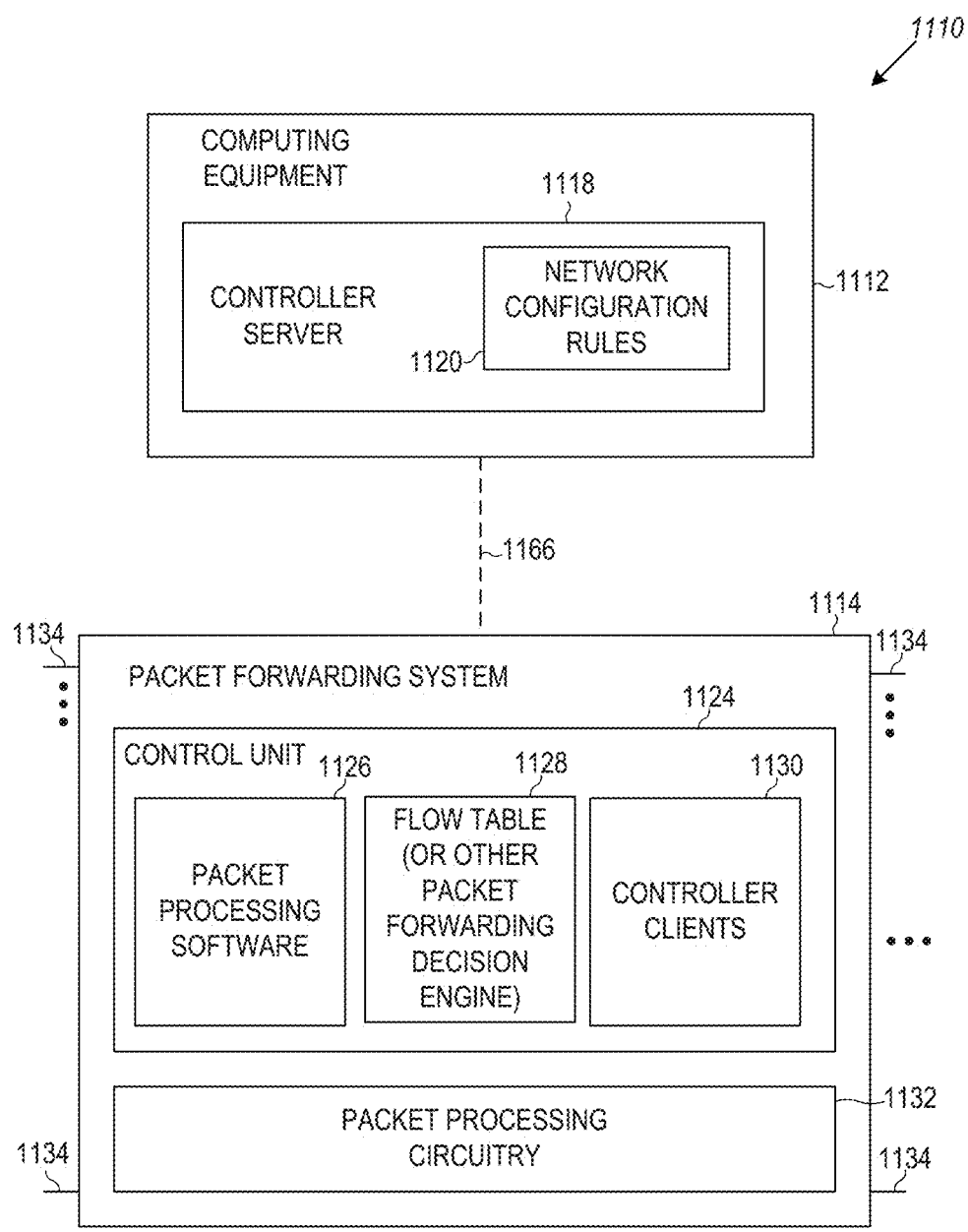
FIG. 11B is a block diagram of a network, according to an example embodiment.

FIG. 11B is a block diagram of illustrating a portion of the network 1110, according to an example embodiment. The network 1110, as shown in greater detail, provides centralized control and includes one or more controller servers such as controller server 1118 and packet forwarding system 1114, according to an embodiment. The controller server 1118 may be implemented on a stand-alone computer, on a cluster of computers, on a set of computers that are distributed among multiple locations, on hardware that is embedded within a network switch, or on other suitable computing equipment 1112. Controller server 1118 can run as a single process on a single computer or can be distributed over several hosts for redundancy. The use of a distributed arrangement may help provide network 1110 with resiliency against unexpected network partitions (e.g., a situation in which a network link between two campuses is disrupted).

In distributed controller arrangements, controller servers 1118 (e.g., controller nodes) can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 1118 of FIG. 11B may gather information about the topology of network 1110. For example, controller server 1118 may send Link Layer Discovery Protocol (LLDP) probe packets through the network 1110 to discover the topology of network 1110. Controller server 1118 may use information on network topology and information on the capabilities of network equipment to determine appropriate paths for packets flowing through the network 1110. Once appropriate paths have been identified, controller server 1118 may send corresponding settings data to the hardware in network 1110 to ensure that packets flow through the network 1110 as desired. Network configuration operations such as these may be performed during system setup operations, continuously in the background, or in response to the appearance of newly transmitted data packets (i.e., packets for which a preexisting path has not been established).

Controller server 1118 may be used to implement network configuration rules, referred to herein as rules 1120. Rules 1120, in the form of network configuration rules, may specify which services are available to various network entities. As an example, rules 1120 may specify which users (or type of users) in the network 1110 may access a particular server. As another example, rules 1120 may include service insertion policies identifying network traffic and services that are to be performed on the identified network traffic. Rules 1120 may, for example, be maintained in a database at computing equipment 1112.

Controller server 1118 and controller clients 1130 at respective packet forwarding systems 1114 (e.g., network switches) may use network protocol stacks to communicate over network paths 1166.

Each packet forwarding system 1114 (e.g., switch) may have input-output ports 1134 (sometimes referred to as network switch interfaces). Cables may be used to connect pieces of equipment to ports 1134. For example, end hosts such as personal computers, web servers, and other computing equipment may be plugged into ports 1134. Ports 1134 may also be used to connect one of packet forwarding systems 1114 (e.g., switches) to other packet forwarding systems 1114 (e.g., switches).

Packet processing circuitry 1132 may be used in forwarding packets from one of ports 1134 to another of ports 1134 and may be used in performing other suitable actions on incoming packets. Packet processing circuitry 1132 may be implemented using one or more integrated circuits such as dedicated high-speed switch circuits and may serve as a hardware data path. If desired, packet processing software 1126 that is running on control unit 1124 may be used in implementing a software data path.

Control unit 1124 may include processing and memory circuits (e.g., one or more microprocessors, memory chips, and other control circuitry) for storing and running control software. For example, control unit 1124 may store and run software such as packet processing software 1126, may store flow table 1128, and may be used to support the operation of controller clients 1130.

Controller clients 1130 and controller server 1118 may be compliant with a network switch protocol such as the OpenFlow protocol (see, e.g., OpenFlow Switch Specification version 1.0.0, 1.3.1, or other versions of the OpenFlow protocol). One or more clients among controller clients 1130 may also be compliant with other protocols (e.g., the Simple Network Management Protocol). Using the OpenFlow protocol or other suitable protocols, controller server 1118 may provide controller clients 1130 with data that determines how packet forwarding system 1114 (e.g., switch) is to process incoming packets from input-output ports 1134.

With one suitable arrangement, flow table data from controller server 1118 may be stored in a flow table such as flow table 1128. The entries of flow table 1128 may be used in configuring packet forwarding system 1114 (e.g., switch) (e.g., the functions of packet processing circuitry 1132 and/or packet processing software 1126). In a typical scenario, flow table 1128 serves as cache storage for flow table entries and a corresponding version of these flow table entries is embedded within the settings maintained by the circuitry of packet processing circuitry 1132. This is, however, merely illustrative. Flow table 1128 may serve as the exclusive storage for flow table entries in packet forwarding system 1114 (e.g., switch) or may be omitted in favor of flow table storage resources within packet processing circuitry 1132. In general, flow table entries may be stored using any suitable data structures (e.g., one or more tables, lists, etc.). For clarity, the data of flow table 1128 (whether maintained in a database in control unit 1124 or embedded within the configuration of packet processing circuitry 1132) is referred to herein as forming flow table entries (e.g., rows in flow table 1128).

The example of flow tables 1128 storing data that determines how packet forwarding system 1114 (e.g., switch) is to process incoming packets are merely illustrative. If desired, any packet forwarding decision engine may be used in place of or in addition to flow tables 1128 to assist packet forwarding system 1114 to make decisions about how to forward network packets. As an example, packet forwarding decision engines may direct packet forwarding system 1114 to forward network packets to predetermined ports based on attributes of the network packets (e.g., based on network protocol headers).

Any desired switch may be provided with controller clients 1130 that communicate with and are controlled by a controller server. For example, packet forwarding system 1114 (e.g., switch) may be implemented using a general-purpose processing platform that runs control software and that omits packet processing circuitry 1132. As another example, packet forwarding system 1114 (e.g., switch) may be implemented using control circuitry that is coupled to one or more high-speed switching integrated circuits ("switch ICs"). As yet another example, packet forwarding system 1114 (e.g., switch) may be implemented as a line card in a rack-based system having multiple line cards each with its own packet processing circuitry. The controller server may, if desired, be implemented on one or more line cards in the rack-based system, in another rack-based system, or on other computing equipment that is coupled to the network 1110.

Figure 12:
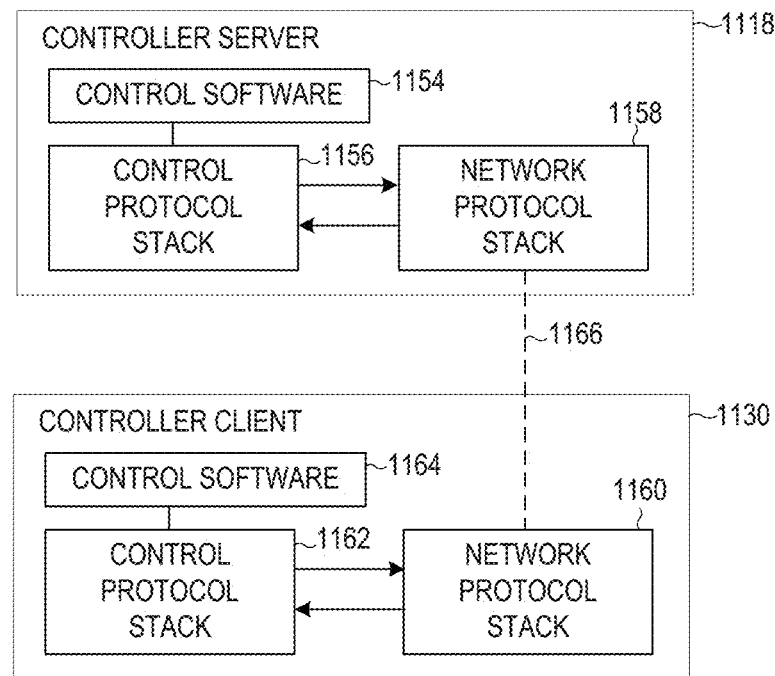
FIG. 12 is a block diagram of a controller server and controller client, according to an embodiment.

FIG. 12 is a block diagram of a controller server 1118 and controller client 1130, according to an embodiment. The controller server 1118 and the controller client 1130 may communicate over a network path 1166 using network protocol stacks such as network protocol stack 1158 and network protocol stack 1160. The network protocol stack 1158 and the network protocol stack 1160 may be, for example Linux TCP/IP stacks or the TCP/IP stack in the VxWorks operating system (as examples). The network path 1166 may be, for example, a path that supports a network connection between packet forwarding system 1114 (e.g., switch) and external equipment (e.g., network link 1116 of FIG. 11A) or may be a backbone path in a rack-based system. Arrangements in which network path 1166 is a network path such as network link 1116 are sometimes described herein as an example.

Control protocol stack 1156 serves as an interface between network protocol stack 1158 and control software 1154. Control protocol stack 1162 serves as an interface between network protocol stack 1160 and control software 1164. During operation, when controller server 1118 is communicating with controller client 1130, control protocol stacks 1156 generate and parse control protocol messages (e.g., control messages to activate a port or to install a particular flow table entry into flow table 1128). By using arrangements of the type shown in FIG. 12, a network connection is formed over the link (e.g., network path 1166) between controller server 1118 and controller client 1130. Controller server 1118 and controller client 1130 can communicate using a Transmission Control Protocol (TCP) or User Datagram Protocol (UDP) over Internet Protocol (IP) network connection. Examples of control protocols that may be used when communicating between controller server 1118 and controller clients 1130 over the network connection include SNMP and OpenFlow protocol stack version 1.0.0 (as examples).

Returning to FIG. 11B, flow table 1128 contains flow table entries (e.g., rows in the table) that have multiple fields (sometimes referred to as header fields). The fields in a packet that has been received by packet forwarding system 1114 (e.g., switch) can be compared to the fields in the flow table 1128. Each flow table entry may have associated actions. When there is a match between the fields in a packet and the fields in a flow table entry, the corresponding action for that flow table entry may be taken.

Figure 13:
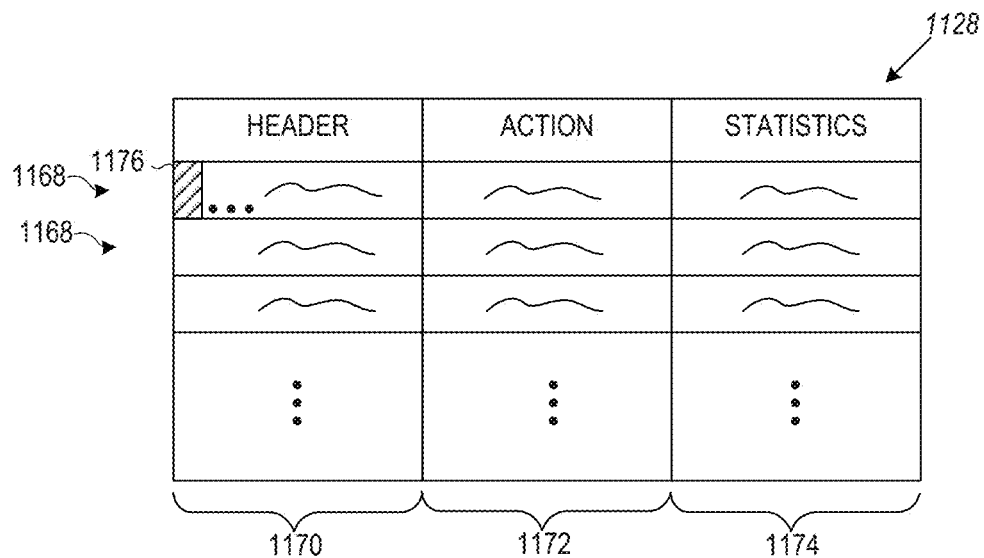
FIG. 13 is a block diagram illustrating a flow table, according to an embodiment.

FIG. 13 is a block diagram illustrating a flow table 1128, according to an embodiment. The flow table 1128 may have flow table entries (rows) 1168. Each flow table entry 1168 may be associated with header 1170, action 1172, and statistics 1174. Each header 1170 may include multiple header fields 1176. The action 1172 in each flow table entry 1168 indicates what action packet forwarding system 1114 (e.g., switch) is to perform on the packet when a match is detected between the fields in the packet and the corresponding fields in the header 1170 of that flow table entry. Packet forwarding system 1114 (e.g., switch) may maintain statistical data (counter values) in the statistics portion of flow table 1128 that can be queried by controller server 1118 when it is desired to obtain information on the performance of packet forwarding system 1114 (e.g., switch).

The header fields in header 1170 (and the corresponding fields in each incoming packet) may include the following fields: ingress port (i.e., the identity of the physical port in packet forwarding system 1114 (e.g., switch) through which the packet is being received), Ethernet source address, Ethernet destination address, Ethernet type, virtual local area network (VLAN) identification (sometimes referred to as a VLAN tag), VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry 1168 (flow entry) is associated with zero or more actions (e.g., action 1172) that dictate how the switch handles matching packets. If no forward actions are present, the packet, according to an embodiment, is dropped. The actions that may be taken by packet forwarding system 1114 (e.g., switch) when a match is detected between packet fields and the header fields in a flow table entry may include the following actions: forward (e.g., ALL to send the packet out on all interfaces, not including the incoming interface, CONTROLLER to encapsulate and send the packet to the controller server 1118, LOCAL to send the packet to the local networking stack of the switch, TABLE to perform actions in flow table 1128, IN PORT to send the packet out of the input port, NORMAL to process the packet with a default forwarding path that is supported by the switch using, for example, traditional level two, VLAN, and level three processing, and FLOOD to flood the packet along the minimum forwarding tree, not including the incoming interface). Additional actions that may be taken by packet forwarding system 1114 (e.g., switch) include: an enqueue action to forward a packet through a queue attached to a port and a drop action (e.g., to drop a packet that matches a flow table entry with no specified action). Modify-field actions may also be supported by packet forwarding system 1114 (e.g., switch). Examples of modify-field actions that may be taken include: Set VLAN ID, Set VLAN priority, Strip VLAN header, Modify VLAN tag, Modify Ethernet source MAC (Media Access Control) address, Modify Ethernet destination MAC address, Modify IPv4 source address, Modify IPv4 ToS bits, Modify transport destination port. The modify-field actions may be used in rewriting portions of network packets that match the flow table entry.

FIG. 14 is a block diagram illustrating a flow table 1128 storing three flow table entries. The entries include fields with wildcards (e.g., "*" symbols). When a wildcard is present in a particular field, all incoming packets will be considered to form a "match" with respect to the field, regardless of the particular value of the field in the incoming packet. Additional fields may match additional packet information (e.g., packet header information of network packets).

Entries in the first, second, and third rows are described. The entry of the first row of the FIG. 14 flow table 1128 directs the switch in which the flow table entry is operating to perform Ethernet switching. In particular, incoming packets with matching Ethernet destination addresses are forwarded to port 3. The entry of the second row of flow table 1128 of FIG. 14 illustrates how a switch may be configured to perform internet routing (i.e., packets are forwarded based on their destination IP address). The third row of the flow table 1128 of FIG. 14 contains an entry that illustrates how a switch may be configured to perform firewalling. When a packet is received that has a destination IP port value of eighty, that packet is dropped (i.e., the switch is configured to serve as a firewall that blocks port eighty traffic).

Flow table entries of the type shown in FIG. 14 may be loaded into a packet forwarding system 1114 (e.g., switch) by controller server 1118 during system setup operations or may be provided to a packet forwarding system 1114 (e.g., switch) from controller server 1118 in real time in response to receipt and processing of packets at controller server 1118 from switches such as packet forwarding system 1114 (e.g., switch). In a network with numerous packet forwarding systems 1114 (e.g., switches), each switch can be provided with appropriate flow table entries to form a path through the network 1110.

Figure 15:
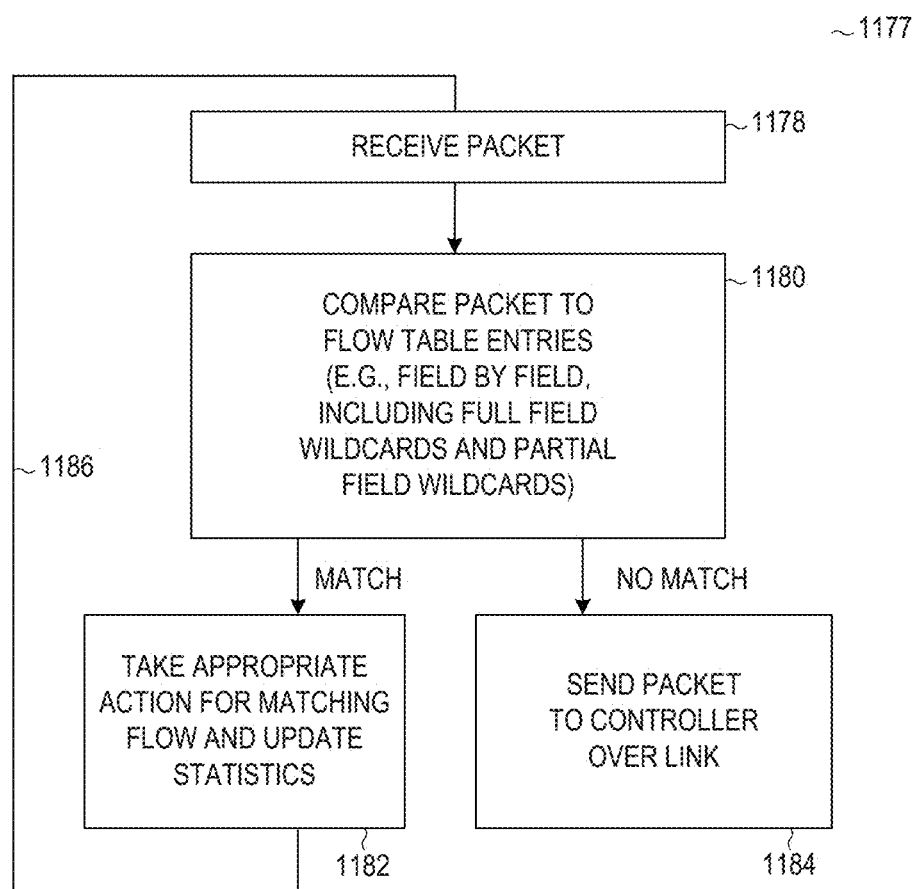
FIG. 15 is a block diagram illustrating a method, according to an embodiment, to process packets.

Illustrative steps that may be performed by packet forwarding system 1114 (e.g., switch) in processing packets that are received on input-output ports 1134 are shown in FIG. 15.

FIG. 15 is a block diagram illustrating a method 1177, according to an embodiment, to process packets. The method 1177 commences at step 1178 with the packet forwarding system 1114 (e.g., switch) receiving a packet on one of its ports (e.g., one of input-output ports 1134 of FIG. 11B).

At step 1180, packet forwarding system 1114 (e.g., switch) compares the fields of the received packet to the fields of the flow table entries in the flow table 1128 of that switch to determine whether there is a match. Some fields in a flow table entry may contain complete values (e.g., complete addresses). Other fields may contain wildcards (i.e., fields marked with the "don't care" wildcard character of "*"). Yet other fields may have partially complete entries (e.g., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, packet forwarding system 1114 (e.g., switch) can take into account whether or not each field in the flow table entry contains a complete value without any wildcarding, a partial value with wildcarding, or a wildcard character (i.e., a completely wildcarded field).

If it is determined during the operations of step 1180 that there is no match between the fields of the packet and the corresponding fields of the flow table entries, packet forwarding system 1114 (e.g., switch) may send the packet to controller server 1118 over network link 1116 (step 1184).

If it is determined during the operations of step 1180 that there is a match between the packet and a flow table entry, packet forwarding system 1114 (e.g., switch) may perform the action that is associated with that flow table entry and may update the counter value in the statistics field of that flow table entry (step 1182). Processing may then loop back to step 1178, so that another packet may be processed by packet forwarding system 1114 (e.g., switch), as indicated by line 1186.

Figure 16:
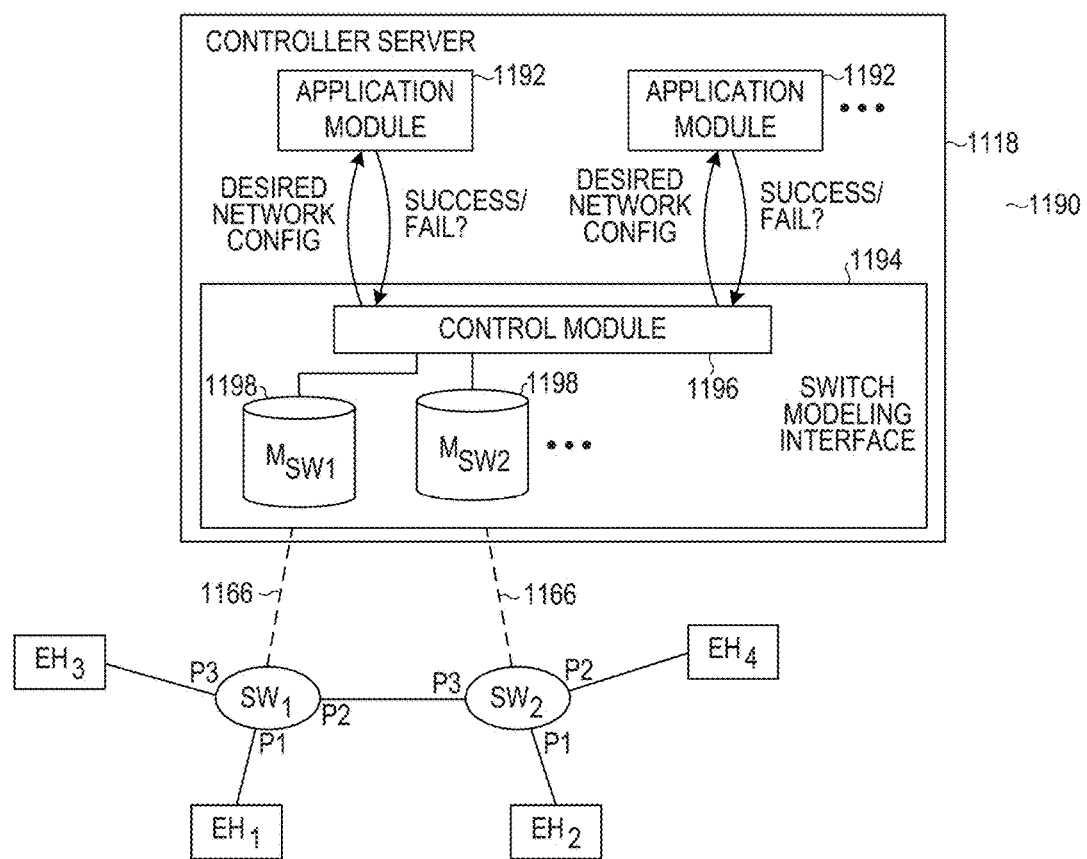
FIG. 16 is a block diagram illustrating the network, according to an embodiment.

FIG. 16 is a block diagram illustrating a network 1190, according to an embodiment. The network 1190, in the description below, is utilized to exemplify a configuration of a multi-vendor network, according to an embodiment. The network 1190 includes switches that may be controlled by the controller server 1118. The controller server 1118 may be a controller server or a distributed controller implemented across multiple computing equipment. As shown in FIG. 16, network 1190 may include switches SW1 and SW2, according to an embodiment. The controller server 1118 may be coupled to the switches of network 1190 via network paths 1166 (e.g., control paths). Controller server 1118 may control the switches using network paths 1166 (e.g., control paths) (e.g., by providing flow table entries such as flow table entries 1168 of FIG. 13). The switches may include switch ports that are coupled to end hosts or to other switches. In the example of FIG. 16, end hosts EH1 and EH3 are coupled to respective ports P1 and P3 of switch SW1, end hosts EH2 and EH4 are coupled to respective ports P1 and P2 of switch SW2, and switches SW1 and SW2 are coupled via port P2 of switch SW1 and port P3 of switch SW2.

Controller server 1118 may include one or more application modules 1192 that control the operations of switches in a network. For example, a first application module 1192 may organize switches into virtual switches formed from groups of end hosts or ports on the switches. In this scenario, the first application module 1192 may control underlying switches SW1 and SW2 of the network in enforcing network policy and forwarding at the virtual switch level (e.g., the network policies may be defined for virtual switches and not the underlying switches). As another example, a second application module 1192 may handle network monitoring functions such as analyzing network traffic to generate network traffic reports. The application modules 1192 may generate and provide desired network configurations (e.g., of the entire network) to switch modeling interface 1194. Switch modeling interface 1194 may use switch models 1198 in implementing the desired network configurations and may indicate to the application modules 1192 whether the implementation is successful or has failed.

Modules such as application modules 1192 may be implemented at controller server 1118 as software on general-purpose or application-specific computing equipment or dedicated hardware. For example, application modules 1192 may be implemented as software modules on shared computing equipment. As another example, application modules 1192 may be implemented on different computing equipment in a distributed controller arrangement.

Application modules 1192 may control switches based on network topology information maintained at the application modules 1192 or maintained by other modules of controller server 1118. However, there may be hundreds, thousands, or more switches in a network. It can be challenging for application modules 1192 to ensure that control messages sent to the switches of a network are successfully received or executed by the switches. In addition, multiple application modules 1192 may be implemented at a controller server 1118 and potentially conflict with each other. Consider the scenario in which a switch fails to implement a flow table entry received from controller server 1118. In this scenario, the state of the switch may not match the expected state and subsequent flow table entries provided by the controller may produce an undesired network configuration.

Controller server 1118 may be provided with a switch modeling interface module (not shown) that handles communications with the switches and maintenance of switch states. The switch modeling interface module may help to ensure that application modules 1192 are synchronized with the switches of the network 1190. The switch modeling interface 1194 may be utilized to implement switch models 1198 that represent each switch in the network 1190. For example, switch model MSW1 may represent switch SW1, whereas switch model MSW2 may represent switch SW2. Switch models MSW1 and MSW2 may maintain information on the current state of respective switches SW1 and SW2. For example, switch model MSW1 may maintain information identifying the forwarding rules or policies that are implemented at switch SW1, whereas switch model MSW2 may identify the state of switch SW2.

Switch models 1198 may be controlled by control module 1196. Control module 1196 may control switch models 1198 and issue control messages to switches of the network 1190 in fulfilling network control requests from application modules 1192. Switch models 1198 may be implemented as a data construct such as a set of tables.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 6-16 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "Internet of things," while yet another combination produces a server computer for use within a cloud computing architecture. Not all combinations of such software and hardware architectures are presented here as those of skill in the art can readily understand how to implement the invention in different contexts from the disclosure contained herein.

Software Architecture

Figure 17:
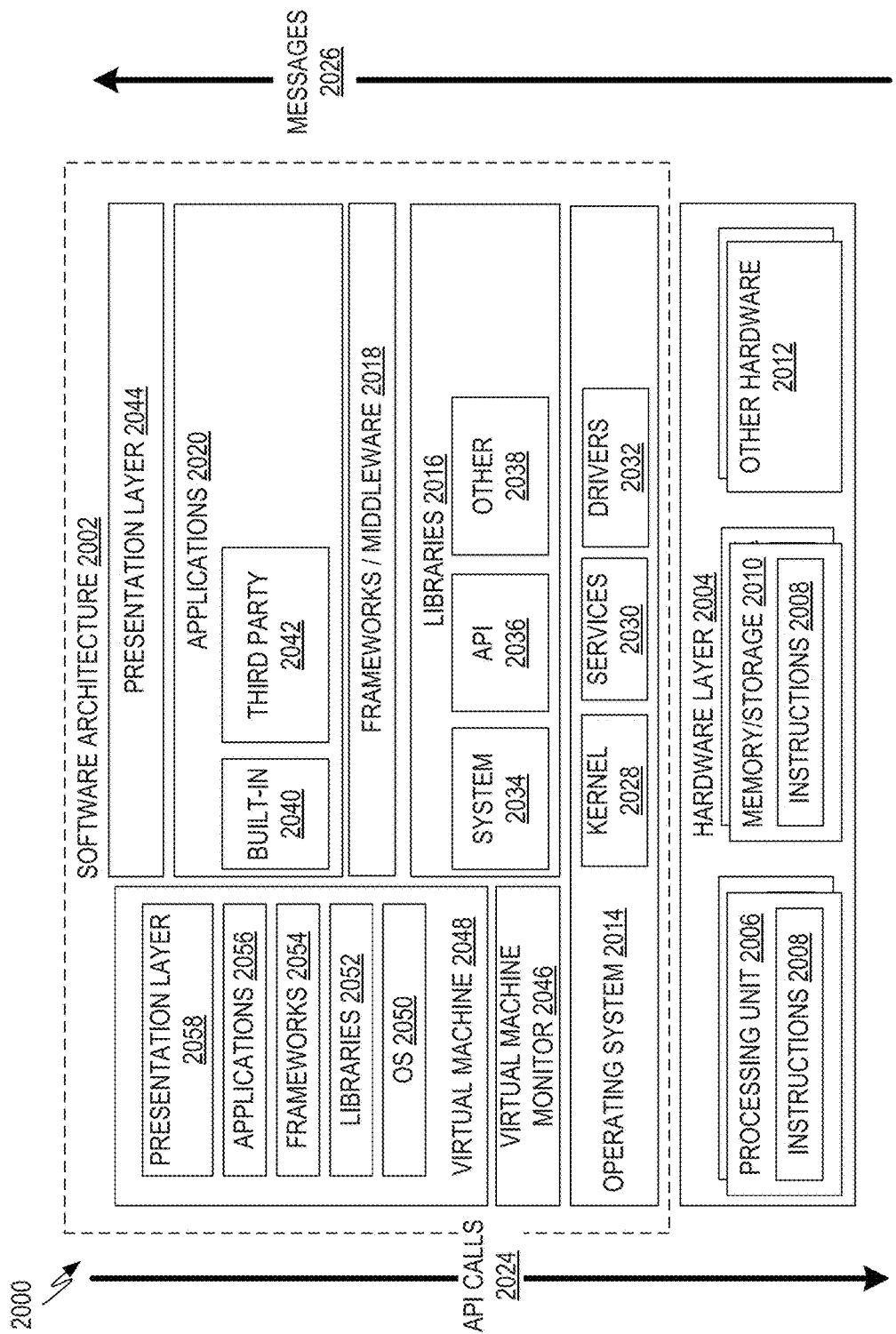
FIG. 17 is a block diagram illustrating a representative software architecture, which may be used in conjunction with various hardware architectures herein described.

FIG. 17 is a block diagram 2000 illustrating a representative software architecture 2002, which may be used in conjunction with various hardware architectures herein described. FIG. 17 is merely a non-limiting example of a software architecture and it will be appreciated that many other architectures may be implemented to facilitate the functionality described herein. The software architecture 2002 may be executing on hardware such as machine 2100 of FIG. 18 that includes, among other things, processors 2110, memory/storage 2130, and I/O components 2150. A representative hardware layer 2004 is illustrated and can represent, for example, the machine 2100 of FIG. 18. The representative hardware layer 2004 comprises one or more processing units 2006 having associated executable instructions 2008. Executable instructions 2008 represent the executable instructions 2008 of the software architecture 2002, including implementation of the methods and modules from FIGS. 2A-2C, FIGS. 3A-3E, FIGS. 4A-4B, FIGS. 5A-5E, FIGS. 6-10 and FIG. 15 and so forth. Hardware layer 2004 also includes memory and/or storage modules 2010, which also have executable instructions 2008. Hardware layer 2004 may also comprise other hardware 2012, which represents any other hardware of the hardware layer 2004, such as the other hardware illustrated as part of machine 2100.

In the example architecture of FIG. 17, the software architecture 2002 may be conceptualized as a stack of layers where each layer provides particular functionality. For example, the software architecture 2002 may include layers such as an operating system 2014, libraries 2016, frameworks/middleware 2018, applications 2020 and presentation layer 2044. Operationally, the applications 2020 and/or other components within the layers may invoke application programming interface (API) calls 2024 through the software stack and receive a response, returned values, and so forth illustrated as messages 2026 in response to the API calls 2024. The layers illustrated are representative in nature and not all software architectures have all layers. For example, some mobile or special purpose operating systems may not provide a frameworks/middleware layer 2018, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 2016 may provide a common infrastructure that may be utilized by the applications 2020 and/or other components and/or layers. The libraries 2016 typically provide functionality that allows other software modules to perform tasks in an easier fashion than to interface directly with the underlying operating system 2014 functionality (e.g., kernel 2028, services 2030 and/or drivers 2032). The libraries 2016 may include system 2034 libraries (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules, as described herein.

The frameworks 2018 (also sometimes referred to as middleware) may provide a higher-level common infrastructure that may be utilized by the applications 2020 and/or other software components/modules. For example, the frameworks 2018 may provide various graphic user interface (GUI) functions, high-level resource management, high-level location services, and so forth. The frameworks 2018 may provide a broad spectrum of other APIs that may be utilized by the applications 2020 and/or other software components/modules, some of which may be specific to a particular operating system 2014 or platform.

The applications 2020 include built-in applications 2040 and/or third-party applications 2042 and/or control modules 114 and/or controller modules 250 including loop-free shortest path algorithm, as described herein, and/or network configuration rules 1120 and/or packet processing software 1126, flow table (or other packet forwarding decision engine) 1128, and/or controller clients 1130 and/or control software 1154 and/or control software 1164 and/or application module 1192 and/or switch modelling interface 1194. Examples of representative built-in applications 2040 may include, but are not limited to, a contacts application, a browser application, a book reader application, a location application, a media application, a messaging application, and/or a game application. Third-party applications 2042 may include any of the built-in applications 2040 as well as a broad assortment of other applications. In a specific example, the third-party application 2042 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 2042 may invoke the API calls 2024 provided by the mobile operating system such as operating system 2014 to facilitate functionality described herein.

The applications 2020 may utilize built-in operating system functions (e.g., kernel 2028, services 2030 and/or drivers 2032), libraries (e.g., system libraries 2034, API libraries 2036, and other libraries 2038), frameworks/middleware 2018 to create user interfaces to interact with users of the system. Alternatively, or additionally, in some systems interactions with a user may occur through a presentation layer, such as presentation layer 2044. In these systems, the application/module "logic" can be separated from the aspects of the application/module that interact with a user.

Some software architectures utilize virtual machines. In the example of FIG. 17, this is illustrated by virtual machine 2048. A virtual machine 2048 creates a software environment where applications 2020/modules can execute as if they were executing on a hardware machine (such as the machine 2100 of FIG. 18, for example). A virtual machine 2048 is hosted by a host operating system (operating system 2014 in FIG. 17) and typically, although not always, has a virtual machine monitor 2046, which manages the operation of the virtual machine 2048 as well as the interface with the host operating system (i.e., operating system 2014). A software architecture executes within the virtual machine 2048 such as an operating system 2050, libraries 2052, frameworks/middleware 2054, applications 2056 and/or presentation layer 2058. These layers of software architecture executing within the virtual machine 2048 can be the same as corresponding layers previously described or may be different.

Example Machine Architecture and Machine-Readable Medium

Figure 18:
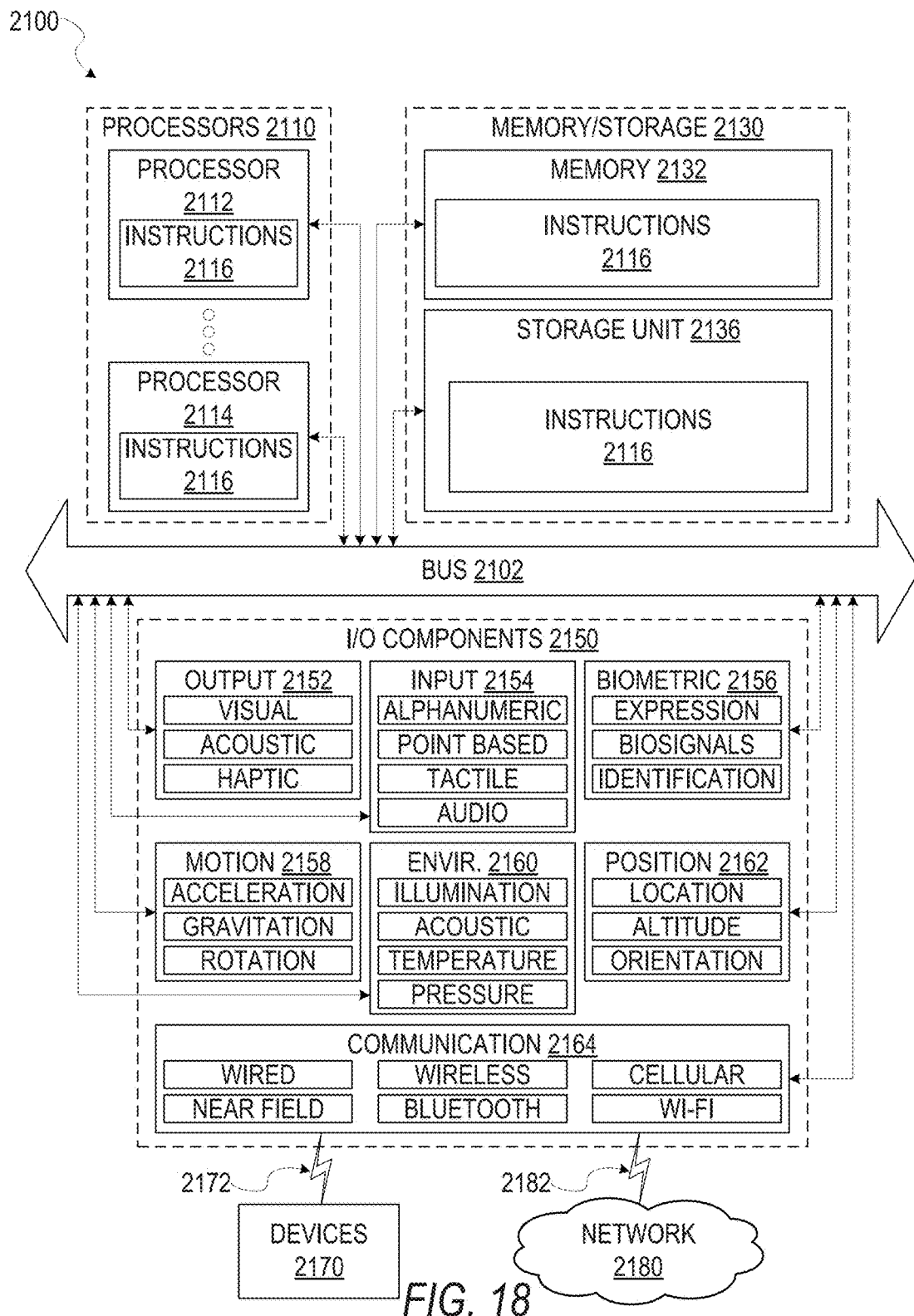
FIG. 18 is a block diagram illustrating a machine, according to some example embodiments.

FIG. 18 is a block diagram illustrating components of a machine 2100, according to some example embodiments, able to read instructions 2116 from a machine-readable medium (e.g., a machine-readable storage medium) and perform any one or more of the methodologies discussed herein. Specifically, FIG. 18 shows a diagrammatic representation of the machine 2100 in the example form of a computer system, within which instructions 2116 (e.g., software, a program, an application 2020, an applet, an app, or other executable code) for causing the machine 2100 to perform any one or more of the methodologies discussed herein may be executed. For example, the instructions 2116 may cause the machine 2100 to execute the flow diagrams of FIGS. 6-10 and FIG. 15. Additionally, or alternatively, the instructions 2116 may implement control modules 114 of FIG. 2B, the controller modules 250 of FIG. 2C, network configuration rules 1120 of FIG. 11B and/or packet processing software 1126, flow table (or other packet forwarding decision engine) 1128, and controller clients 1130 of FIG. 11B, and/or control software 1154 of FIG. 12 and/or control software 1164 of FIG. 12 and/or application module 1192 of FIG. 16 and/or switch modelling interface 1194 of FIG. 16 and so forth. The instructions 2116 transform the general, non-programmed machine 2100 into a particular machine 2100 programmed to carry out the described and illustrated functions in the manner described. In alternative embodiments, the machine 2100 operates as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2116, sequentially or otherwise, that specify actions to be taken by machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory/storage 2130, and I/O components 2150, which may be configured to communicate with each other such as via a bus 2102. In an example embodiment, the processors 2110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, processor 2112 and processor 2114 that may execute instructions 2116. The term "processor" is intended to include a multi-core processor 2110 that may comprise two or more independent processors 2112, 2114 (sometimes referred to as "cores") that may execute instructions 2116 contemporaneously. Although FIG. 18 shows multiple processors 2112, 2114, the machine 2100 may include a single processor 2112 with a single core, a single processor 2112 with multiple cores (e.g., a multi-core processor), multiple processors 2112, 2114 with a single core, multiple processors 2112, 2114 with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116 embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of processors 2110 are examples of machine-readable media.

As used herein, "machine-readable medium" means a device able to store instructions 2116 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 2116. The term "machine-readable medium" shall also be taken to include any medium, or combination of multiple media, that is capable of storing instructions (e.g., instructions 2116) for execution by a machine (e.g., machine 2100), such that the instructions 2116, when executed by one or more processors of the machine 2100 (e.g., processors 2110), cause the machine 2100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2150 may include a wide variety of components to receive input, provide output, produce output, transmit information, exchange information, capture measurements, and so on. The specific I/O components 2150 that are included in a particular machine 2100 will depend on the type of machine 2100. For example, portable machines such as mobile phones will likely include a touch input device or other such input mechanisms, while a headless server machine will likely not include such a touch input device. It will be appreciated that the I/O components 2150 may include many other components that are not shown in FIG. 18. The I/O components 2150 are grouped according to functionality merely for simplifying the following discussion and the grouping is in no way limiting. In various example embodiments, the I/O components 2150 may include output components 2152 and input components 2154. The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162 among a wide array of other components. For example, the biometric components 2156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 may include acceleration sensor components (e.g., accelerometer), gravitation sensor components, rotation sensor components (e.g., gyroscope), and so forth. The environmental components 2160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2150 may include communication components 2164 operable to couple the machine 2100 to a network 2180 or devices 2170 via coupling 2182 and coupling 2172 respectively. For example, the communication components 2164 may include a network interface component or other suitable device to interface with the network 2180. In further examples, communication components 2164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 2170 may be another machine or any of a wide variety of peripheral devices (e.g., a peripheral device coupled via a Universal Serial Bus (USB)).

Moreover, the communication components 2164 may detect identifiers or include components operable to detect identifiers. For example, the communication components 2164 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2164, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 2180 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or other type of cellular or wireless coupling. In this example, the coupling 2182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., hypertext transfer protocol (HTTP)). Similarly, the instructions 2116 may be transmitted or received using a transmission medium via the coupling 2172 (e.g., a peer-to-peer coupling) to devices 2170. The term "transmission medium" shall be taken to include any intangible medium that is capable of storing, encoding, or carrying instructions 2116 for execution by the machine 2100, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The example embodiments illustrated herein are described in sufficient detail to enable those skilled in the art to practice the teachings disclosed. Other example embodiments may be used and derived therefrom, such that structural and logical substitutions and changes may be made without departing from the scope of this disclosure. The Detailed Description, therefore, is not to be taken in a limiting sense, and the scope of various example embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various example embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of example embodiments of the present disclosure as represented by the appended claims. The specification and drawings are, accordingly, to be regarded in an illustrative rather than a restrictive sense.

What is claimed is:

1. A controller server comprising:
at least one processor and executable instructions accessible on a computer-readable medium that, when executed, cause the at least one processor to perform operations comprising:
receiving first multicast group member information, from over a network and via a first packet forwarding system, at the controller server that provides for control of the network comprised of a first virtual local area network comprised of a first plurality of packet forwarding systems including the first packet forwarding system, the first multicast group member information including access information, the first multicast group member information being received by the first packet forwarding system from a first end-host computer and describing the first end-host computer as accessing a first multicast group on the first virtual local area network via a new access point on the network including a port on the first packet forwarding system;
registering the first end-host computer as having moved from an old access point on the network to the new access point on the network, the registering including processing a leave operation for the first end-host computer and processing a join operation for the first end-host computer, the processing the leave and the join operations being responsive to the receiving the first multicast group member information from over the network at the controller server;
generating a first multicast tree, at the controller server; and
communicating a first network configuration message, over the network, to at least one packet forwarding system of the first plurality of packet forwarding systems, the first network configuration message including a packet flow table entry enabling the at least one packet forwarding system of the first plurality of packet forwarding systems to configure a flow table to enable communication of multicast traffic for the first multicast group over a portion of the first multicast tree.

2. The controller server of claim 1, further comprising:
receiving second multicast group member information, from over the network and via the first packet forwarding system, at the controller server that provides for central control of the network comprised of the first virtual local area network, the second multicast group member information being received by the first packet forwarding system from a second end-host computer and describing the second end-host computer as joining the first multicast group on the first virtual local area network, wherein the first multicast group member information comprises poll information and wherein the poll information comprises at least one join registration and wherein the at least one join registration comprises a first join registration and wherein the first join registration comprises virtual local area network information and multicast group information.

3. The controller server of claim 1, wherein the generating is based on a network topology that describes an interconnection of the first plurality of packet forwarding systems and wherein the first multicast tree describes communication of the multicast traffic for the first multicast group in the first virtual local area network.

4. The controller server of claim 1, wherein the network is further comprised of a second virtual local area network and wherein the second virtual local area network is comprised of a second plurality of packet forwarding systems that includes a second packet forwarding system.

5. The controller server of claim 4, further comprising receiving a third multicast group member information, from over the network and via the second packet forwarding system, at the controller server that provides for central control of the network comprised of the first virtual local area network and the second virtual local area network.

6. The controller server of claim 5, wherein the third multicast group member information is being received by the second packet forwarding system from a third end-host computer and the third multicast group member information is describing the third end-host computer as joining the first multicast group on the second virtual local area network.

7. The controller server of claim 6, wherein the third multicast group member information includes report information describing the first multicast group and the second virtual local area network.

8. The controller server of claim 7, further comprising generating a second multicast tree, at the controller server, the second multicast tree being for the first multicast group that is spanning the first virtual local area network and the second virtual local area network and wherein the generating the second multicast tree is responsive to receiving the third multicast group member information at the controller server.

9. The controller server of claim 7, further comprising communicating a second network configuration message, over the network, to at least one of the second plurality of packet forwarding systems, the second network configuration message including a packet flow table entry enabling the at least one of the second plurality of packet forwarding systems to configure a flow table to enable communication of the multicast traffic for the first multicast group over a portion of the first multicast tree.

10. A method performed at a controller server, the method comprising:
receiving first multicast group member information, from over a network and via a first packet forwarding system, at the controller server that provides for control of the network comprised of a first virtual local area network comprised of a first plurality of packet forwarding systems including the first packet forwarding system, the first multicast group member information including access information, the first multicast group member information being received by the first packet forwarding system from a first end-host computer and describing the first end-host computer as accessing a first multicast group on the first virtual local area network via a new access point on the network including a port on the first packet forwarding system;
registering the first end-host computer as having moved from an old access point on the network to the new access point on the network, the registering including processing a leave operation for the first end-host computer and processing a join operation for the first end-host computer, the processing the leave and the join operations being responsive to the receiving the first multicast group member information from over the network at the controller server;
generating a first multicast tree, at the controller server; and
communicating, by the controller server, a first network configuration message, over the network, to at least one packet forwarding system of the first plurality of packet forwarding systems, the first network configuration message including a packet flow table entry enabling the at least one packet forwarding system of the first plurality of packet forwarding systems to configure a flow table to enable communication of multicast traffic for the first multicast group over a portion of the first multicast tree.

11. The method of claim 10, further comprising receiving second multicast group member information, from over the network and via the first packet forwarding system, at the controller server that provides for central control of the network comprised of the first virtual local area network, the second multicast group member information being received by the first packet forwarding system from a second end-host computer and describing the second end-host computer as joining the first multicast group on the first virtual local area network, wherein the first multicast group member information comprises poll information and wherein the poll information comprises at least one join registration and wherein the at least one join registration comprises a first join registration and wherein the first join registration comprises virtual local area network information and multicast group information.

12. The method of claim 10, wherein the generating is based on a network topology that describes an interconnection of the first plurality of packet forwarding systems and wherein the first multicast tree describes communication of multicast traffic for the first multicast group in the first virtual local area network.

13. The method of claim 10, wherein the network is further comprised of a second virtual local area network and wherein the second virtual local area network is comprised of a second plurality of packet forwarding systems that includes a second packet forwarding system.

14. The method of claim 13, further comprising receiving a third multicast group member information, from over the network and via the second packet forwarding system, at the controller server that provides for central control of the network comprised of the first virtual local area network and the second virtual local area network.

15. The method of claim 14, wherein the third multicast group member information is being received by the second packet forwarding system from a third end-host computer and the third multicast group member information is describing the third end-host computer as joining the first multicast group on the second virtual local area network.

16. The method of claim 15, wherein the third multicast group member information includes report information describing the first multicast group and the second virtual local area network.

17. The method of claim 16, further comprising generating a second multicast tree, at the controller server, the second multicast tree being for the first multicast group spanning the first virtual local area network and the second virtual local area network and wherein the generating the second multicast tree is responsive to receiving the third multicast group member information at the controller server.

18. The method of claim 16, further comprising communicating a second network configuration message, over the network, to at least one of the second plurality of packet forwarding systems, the second network configuration message including a packet flow table entry enabling the at least one of the second plurality of packet forwarding systems to configure a flow table to enable communication of the multicast traffic for the first multicast group over a portion of the first multicast tree.

19. A machine-readable medium storing instructions having no transitory signals and that, when executed by at least one processor, cause at least one processor to perform actions comprising:

at a controller server:

receiving first multicast group member information, from over a network and via a first packet forwarding system, at the controller server that provides for control of the network comprised of a first virtual local area network comprised of a first plurality of packet forwarding systems including the first packet forwarding system, the first multicast group member information including access information, the first multicast group member information being received by the first packet forwarding system from a first end-host computer and describing the first end-host computer as accessing a first multicast group on the first virtual local area network via a new access point on the network including a port on the first packet forwarding system;

registering the first end-host computer as having moved from an old access point on the network to the new access point on the network, the registering including processing a leave operation for the first end-host computer and processing a join operation for the first end-host computer, the processing the leave and the join operations being responsive to the receiving the first multicast group member information from over the network at the controller server;

generating a first multicast tree, at the controller server; and communicating, by the controller server, a first network configuration message, over the network, to at least one packet forwarding system of the first plurality of packet forwarding systems, the first network configuration message including a packet flow table entry enabling the at least one packet forwarding system of the first plurality of packet forwarding systems to configure a flow table to enable communication of multicast traffic for the first multicast group over a portion of the first multicast tree.

20. The machine-readable medium of claim 19, wherein the generating is based on a network topology that describes an interconnection of the first plurality of packet forwarding systems and wherein the first multicast tree describes communication of multicast traffic for the first multicast group in the first virtual local area network.

* * * * *